(12) United States Patent
Yamazaki et al.

(10) Patent No.: US 9,268,247 B2
(45) Date of Patent: Feb. 23, 2016

(54) POWER TRANSMISSION DEVICE AND IMAGE FORMING APPARATUS INCLUDING THE SAME

(71) Applicants: Kimiharu Yamazaki, Kanagawa (JP); Katsuaki Miyawaki, Kanagawa (JP); Tetsuo Watanabe, Kanagawa (JP); Hiromichi Matsuda, Kanagawa (JP)

(72) Inventors: Kimiharu Yamazaki, Kanagawa (JP); Katsuaki Miyawaki, Kanagawa (JP); Tetsuo Watanabe, Kanagawa (JP); Hiromichi Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/451,697

(22) Filed: Aug. 5, 2014

(65) Prior Publication Data
US 2015/0053032 A1 Feb. 26, 2015

(30) Foreign Application Priority Data

Aug. 23, 2013 (JP) .................. 2013-173776
Feb. 27, 2014 (JP) .................. 2014-036309
Mar. 25, 2014 (JP) .................. 2014-061288

(51) Int. Cl.
| | |
|---|---|
| *G03G 15/00* | (2006.01) |
| *F16D 11/00* | (2006.01) |
| *F16D 1/10* | (2006.01) |
| *F16D 3/50* | (2006.01) |
| *G03G 21/18* | (2006.01) |

(52) U.S. Cl.
CPC ............... *G03G 15/00* (2013.01); *F16D 11/00* (2013.01); *F16D 3/50* (2013.01); *F16D 2001/103* (2013.01); *G03G 21/186* (2013.01); *Y10T 74/19642* (2015.01)

(58) Field of Classification Search
CPC .... F16D 3/50; F16D 2001/103; G03G 21/186
USPC .......................................................... 399/167
See application file for complete search history.

(56) References Cited

U.S. PATENT DOCUMENTS

| | | | | |
|---|---|---|---|---|
| 5,709,765 | A * | 1/1998 | Herbert et al. ................. | 156/293 |
| 6,023,836 | A * | 2/2000 | Matsuoka et al. .............. | 29/557 |
| 7,087,166 | B1 * | 8/2006 | Sudo et al. ..................... | 210/232 |
| 2002/0025191 | A1 * | 2/2002 | Kitayama ..................... | 399/222 |

(Continued)

FOREIGN PATENT DOCUMENTS

| | | |
|---|---|---|
| JP | 2001-200858 | 7/2001 |
| JP | 2001200858 A * | 7/2001 |

(Continued)

*Primary Examiner* — David Gray
*Assistant Examiner* — Tyler Hardman
(74) *Attorney, Agent, or Firm* — Harness, Dickey & Pierce, P.L.C.

(57) ABSTRACT

A power transmission device includes a drive coupling, a driven coupling, and an intermediate transmission member. The drive coupling receives power from a drive source and rotates. The driven coupling is disposed coaxially on a first rotary shaft of the drive coupling and detachably attachable relative to the main body of the image forming apparatus. The intermediate transmission member meshes with the drive coupling and the driven coupling and is held by one of the drive coupling and the driven coupling in a state in which the driven coupling is disengaged from the main body. One of the drive coupling and the driven coupling, whichever holds the intermediate transmission member, constitutes a retaining coupling including an attachment member attached to one of a drive-side device and a driven-side device, and a stopper assembly facing the intermediate transmission member in an axial direction of the first rotary shaft.

19 Claims, 15 Drawing Sheets

(56) References Cited

U.S. PATENT DOCUMENTS

| | | |
|---|---|---|
| 2006/0289028 A1* | 12/2006 | Lee et al. .................. 132/229 |
| 2007/0055288 A1* | 3/2007 | Burneikis .................. 606/108 |
| 2010/0211052 A1* | 8/2010 | Brown et al. .................. 606/1 |
| 2012/0196720 A1* | 8/2012 | Miyawaki et al. .......... 475/345 |
| 2012/0305727 A1* | 12/2012 | Bouissiere ................ 248/309.1 |
| 2014/0356027 A1* | 12/2014 | Yamazaki et al. .......... 399/167 |

FOREIGN PATENT DOCUMENTS

| | | |
|---|---|---|
| JP | 2001-324845 | 11/2001 |
| JP | 2004211789 A * | 7/2004 |
| JP | 2008-002671 | 1/2008 |
| JP | 2011-197298 | 10/2011 |
| JP | 2014-052618 | 3/2014 |

* cited by examiner

POWER TRANSMISSION DEVICE AND IMAGE FORMING APPARATUS INCLUDING THE SAME

CROSS-REFERENCE TO RELATED APPLICATIONS

This patent application is based on and claims priority pursuant to 35 U.S.C. §119 from Japanese Patent Application Nos. 2013-173776, filed on Aug. 23, 2013, 2014-036309, filed on Feb. 27, 2014, and 2014-061288, filed on Mar. 25, 2014, in the Japan Patent Office, which are hereby incorporated herein by reference in their entirety.

BACKGROUND

1. Technical Field

Exemplary aspects of the present invention generally relate to a power transmission unit and an image forming apparatus.

2. Description of the Related Art

An electrophotographic image forming apparatus generally includes rotary bodies such as a photosensitive member and a development roller driven by a power transmission device to form an image. Such rotary bodies are often detachably attachable relative to a main body of the image forming apparatus. The power transmission device to transmit a driving force from a drive source in the main body to the rotary bodies is provided with a coupling that detachably connects the drive source and the rotary body.

SUMMARY

In view of the foregoing, in an aspect of this disclosure, there is provided a novel power transmission device including a drive coupling, a driven coupling, and an intermediate transmission member. The drive coupling receives power from a drive source of a main body of an image forming apparatus and rotates. The driven coupling is disposed coaxially on a first rotary shaft of the drive coupling and detachably attachable relative to the main body of the image forming apparatus. The intermediate transmission member meshes with the drive coupling and the driven coupling and is held by one of the drive coupling and the driven coupling in a state in which the driven coupling is disengaged from the main body. One of the drive coupling and the driven coupling, whichever holds the intermediate transmission member, constitutes a retaining coupling including an attachment member attached to one of a drive-side device and a driven-side device, and a stopper assembly facing the intermediate transmission member in an axial direction of the first rotary shaft.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION

Figure 1:
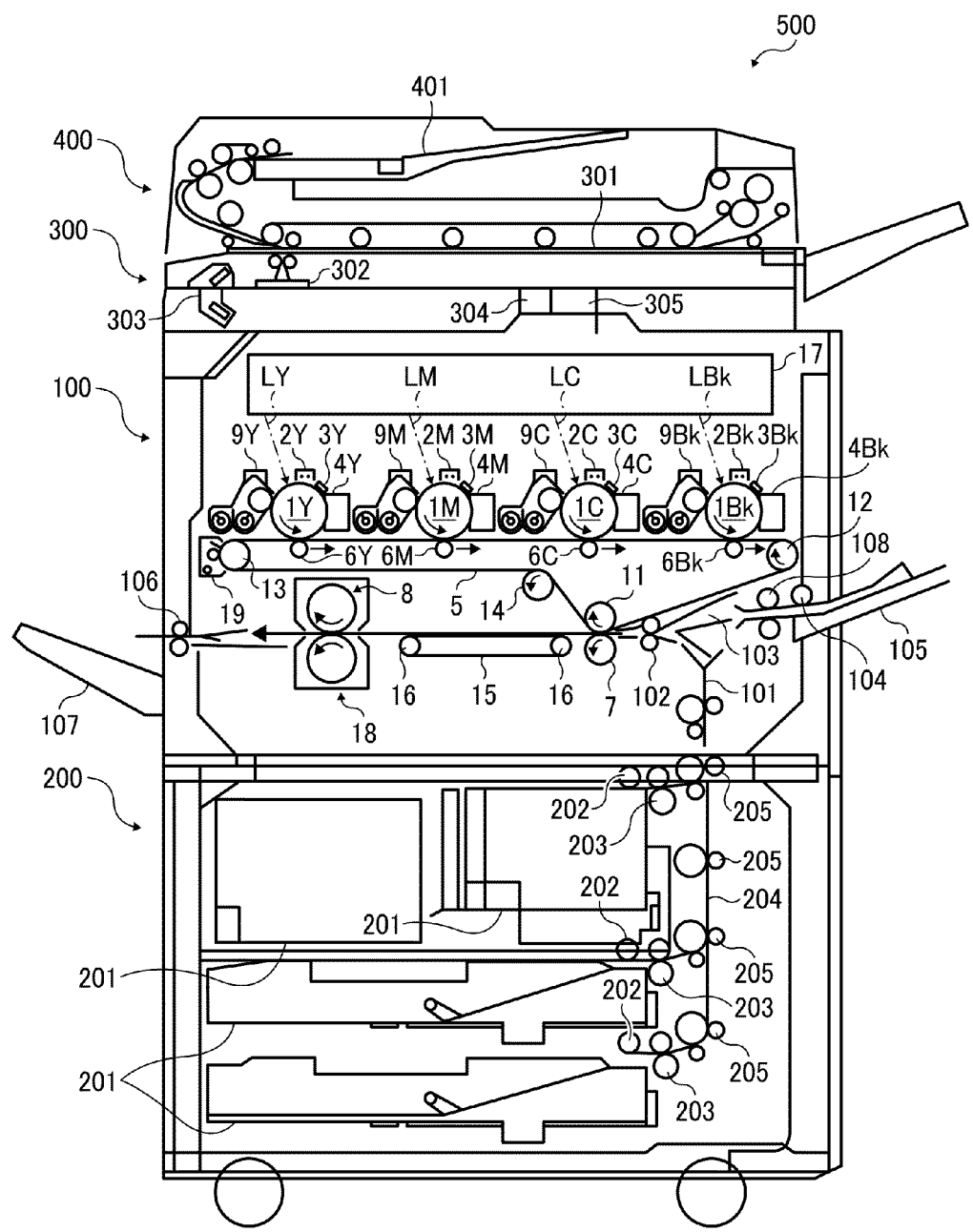
FIG. 1 is a schematic diagram illustrating a copier as an example of an image forming apparatus, according to an illustrative embodiment of the present disclosure.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural foams as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, exemplary embodiments of the present patent application are described.

[Embodiment 1]

A description is provided of an electrophotographic color printer as an example of an image forming apparatus.

FIG. 1 is a schematic diagram illustrating an image forming apparatus 500 according to an illustrative embodiment of the present disclosure.

It is to be noted that the image forming apparatus 500 according to the illustrative embodiment is a so-called tandem-type image forming apparatus using a two-component, dry developing agent. The image forming apparatus 500 includes a sheet feeding unit 200, a main body 100 disposed on the sheet feeding unit 200, a scanner 300 disposed on the main body 100, and an automatic document feeder (ADF) 400 disposed on the scanner 300.

In the image forming apparatus 500, image forming operation is performed by receiving image data including image information from the scanner 300 or an external device such as a personal computer (PC). As illustrated in FIG. 1, the main body 100 includes four cylindrical-shaped photosensitive members (hereinafter referred to as photosensitive drums) 1Y, 1M, 1C, and 1BK, each serving as a latent image bearing member, arranged in tandem along an intermediate transfer belt 5 and rotatably driven by a driving device. The photosensitive drums 1Y, 1M, 1C, and 1Bk may be collectively referred to as photosensitive drums 1.

It is to be noted that the suffixes Y, M, C, and Bk denote colors yellow, magenta, cyan, and black, respectively. To simplify the description, these suffixes Y, M, C, and Bk indicating colors are omitted herein, unless otherwise specified. The intermediate transfer belt 5 is formed into a loop and entrained around a plurality of rollers including a drive roller. The photosensitive drums 1Y, 1M, 1C, and 1Bk are arranged in tandem along the direction of movement of the intermediate transfer belt 5 and contact the intermediate transfer belt 5.

The photosensitive drums 1Y, 1M, 1C, and 1Bk are surrounded by various pieces of imaging equipment. For example, charging devices 2Y, 2M, 2C, and 2Bk, development devices 9Y, 9M, 9C, and 9Bk, cleaning devices 4Y, 4M, 4C, and 4Bk, and charge erasing lamps 3Y, 3M, 3C, and 3Bk are respectively provided around the photosensitive drums 1Y, 1M, 1C, and 1Bk in the order of electrophotographic process. An optical writing unit 17 is disposed substantially above the photosensitive drums 1. Primary transfer rollers 6Y, 6M, 6C, and 6Bk serving as primary transfer devices are disposed opposite the respective photosensitive drums 1Y, 1M, 1C, and 1Bk via the intermediate transfer belt 5.

The intermediate transfer belt 5 is entrained around a plurality of support rollers 11, 12, and 13, and a tension roller 14. The support roller 12 is a drive roller which is driven to rotate by a drive source, thereby rotating the intermediate transfer belt 5. A belt cleaning device 19 is disposed opposite the support roller 13 via the intermediate transfer belt 5. The belt cleaning device 19 removes residual toner remaining on the intermediate transfer belt 5 after secondary transfer process. The support roller 11 is a secondary transfer opposed roller disposed opposite a secondary transfer roller 7 serving as a secondary transfer device via the intermediate transfer belt 5, thereby forming a secondary transfer nip between the intermediate transfer belt 5 and the secondary transfer roller 7.

Downstream from the secondary transfer nip in the direction of conveyance of a recording medium, there is provided a sheet conveyor belt 15 held taut by a pair of support rollers 16. The sheet conveyor belt 15 delivers to a fixing device 18 a recording medium bearing an unfixed toner image on the surface thereof. The fixing device 18 includes a pair of fixing rollers 8 defining a fixing nip therebetween. Heat and pressure are applied to the recording medium delivered to the fixing nip, and the unfixed toner image is fused and fixed on the recording medium.

Next, a description is provided of copying operation of the image forming apparatus 500.

According to the present illustrative embodiment, when forming a full-color image, a document is placed on a document table 401 of the ADF 400. Alternatively, the ADF 400 is lifted open and the document can be placed on an exposure glass 301 of the scanner 300. After placing the document, the ADF 400 is closed to hold the document. In a case in which the document is placed on the document table 401 of the ADF 400, when a start button is pressed by users, the document is sent onto the exposure glass 301. Subsequently, the scanner 300 is activated, thereby moving a first carriage 302 and a second carriage 303 along the document surface. A light source of the first carriage 302 projects light against the document, which is then reflected by the document on the exposure glass 301. Subsequently, the reflected light is reflected by a mirror of the second carriage 303 towards a focusing lens 304 which directs the light to a read sensor 305. The read sensor 305 reads image information of the document.

As the start button is pressed, a motor is driven, enabling the support roller 12 as the drive roller to rotate and hence rotating the intermediate transfer belt 5. In the meantime, the photosensitive drum 1Y is rotated in the direction indicated by arrow by a photosensitive-drum driving unit and charged uniformly by the charging device 2Y while rotating. Subsequently, the photosensitive drum 1Y is illuminated with a light beam LY projected from the optical writing unit 17, thereby forming an electrostatic latent image of yellow on the surface of the photosensitive drum 1Y The electrostatic latent image of yellow on the photosensitive drum 1Y is developed with yellow toner by the development device 9Y, thereby forming a visible image, also known as a toner image. Upon development, a predetermined development bias is supplied between a development rollers of the development device 9Y and the photosensitive drum 1Y so that the yellow toner on the development roller is attracted electrostatically to the electrostatic latent image on the photosensitive drum 1Y.

Subsequently, the toner image of yellow formed on the surface of the photosensitive drum 1Y comes to a primary transfer position at which the photosensitive drum 1Y contacts the intermediate transfer belt 5 as the photosensitive drum 1Y rotates. At the primary transfer position, the predetermined bias voltage is supplied to the rear surface of the intermediate transfer belt 5 by the primary transfer roller 6Y disposed inside the looped intermediate transfer belt 5, across from the photosensitive drum 1Y. Application of the bias voltage generates a primary transfer electric field which causes the yellow toner image on the photosensitive drum 1Y to move to the intermediate transfer belt 5. This process is known as primary transfer.

Similar to the toner image of yellow, toner images of magenta, cyan, and black are formed on the photosensitive drums 1M, 1C, and 1Bk, respectively, and transferred onto the intermediate transfer belt 5 such that they are superimposed one atop the other on top of the yellow toner image. Accordingly, a composite toner image is formed on the intermediate transfer belt 5. It is to be noted that after secondary transfer, the residual toner remaining on the intermediate transfer belt 5 is removed by the belt cleaning device 19.

The sheet feeding unit 200 includes a plurality of sheet cassettes 201, sheet feed rollers 202, separation rollers 203, conveyor rollers 205, and a sheet passage 204. When the start button is pressed, one of the sheet feed rollers 202 starts to rotate in accordance with the type of the recording medium selected by the user, thereby feeding the recording medium from the respective sheet cassette 201. The recording medium picked up by the sheet feed roller 202 is fed to the sheet passage 204 one by one by the separation roller 203. Subsequently, the recording medium is delivered to a sheet passage 101 in the main body 100 by the conveyor rollers 205. The recording medium contacts a pair of registration rollers 102 and stops temporarily.

In a case in which a recording medium which is not stored in the sheet cassette 201 is used, the recording medium is placed manually on a side tray 105 and a sheet feed roller 104 sends the recording medium on the side tray 105 to a separation roller 108 which feeds the recording medium to a sheet passage 103 one by one. Similar to sending the recording medium from the sheet cassette 201, the recording medium sent from the side tray 105 contacts the pair of registration rollers 102.

As the intermediate transfer belt 5 rotates, the composite toner image formed on the intermediate transfer belt 5 is delivered to the secondary transfer nip (i.e., a secondary transfer position) at which the intermediate transfer belt 5 contacts the secondary transfer roller 7. As described above, the pair of registration rollers 102 temporarily stops the recording medium. The pair of registration rollers 102 starts to rotate again and sends the recording medium to the secondary transfer nip in appropriate timing such that the recording medium is aligned with the composite toner image formed on the intermediate transfer belt 5. At the secondary transfer nip, the secondary transfer roller 7 supplies a predetermined bias voltage to the back of the recording medium, thereby generating a secondary transfer electric field. Due to the secondary electric field and the pressure applied to the recording medium, the toner image on the intermediate transfer belt 5 is transferred onto the recording medium.

Subsequently, the recording medium, on which the composite toner image is secondarily transferred, is delivered to the fixing device 18 by the sheet conveyor belt 15. The toner image is fused and fixed onto the recording medium by heat and pressure applied thereto by the pair of fixing rollers 8 as the recording medium passes between the fixing rollers 8 in the fixing process. After the fixing process, the recording medium is output onto an output tray 107 disposed at the exterior side of the image forming apparatus by a pair of sheet output rollers 106.

In order to facilitate an understanding of the novel features of the present disclosure, as a comparison a description is provided of a conventional power transmission device.

In a known power transmission device, an output shaft of a drive source and an input shaft of a rotary body are disposed coaxially, and an intermediate transmission member is disposed between the output shaft and the input shaft. The intermediate transmission member includes an internal gear that meshes with both an external gear on the output shaft of the drive source and an external gear on the input shaft of the rotary body. More specifically, the known power transmission device employs a two-stage coupling system consisting of a first stage coupling at which an output external gear formed directly on the output shaft of the drive source meshes with an input internal gear on the intermediate transmission member and a second stage coupling at which an output internal gear of the intermediate transmission member meshes with an input external gear directly formed on the input shaft of the rotary body.

The intermediate transmission member is supported only by the output shaft of the drive source and the input shaft of the rotary body during transmission of power. In this configuration, eccentricity and declination of the output shaft of the drive source and the input shaft of the rotary body, and misalignment of gears on the output shaft of the drive source and the input shaft of the rotary body are absorbed by the intermediate transmission member between the output shaft and the input shaft, thereby transmitting the driving force from the drive source to the rotary body.

The known power transmission device includes also a stopper to prevent the intermediate transmission member from falling off from the output shaft of the drive source when the rotary body is removed from the main body of the image forming apparatus. One end of the stopper is fitted with a groove of the intermediate transmission member, and the other end thereof is fastened by a screw.

The known intermediate transmission member is mounted such that after the output external gear on the output shaft in the main body of the image forming apparatus meshes with the input internal gear of the intermediate transmission member so that the intermediate transmission member is held by the output shaft of the drive source, one end of the stopper is fitted into the groove of the intermediate transmission member and the other end is fastened to the main body by the screw.

The output external gear on the output shaft on the drive source side is surrounded by a relatively large number of parts and devices. Furthermore, the output external gear on the output shaft of the drive source side is located in the distal side of the image forming apparatus. Consequently, it is difficult to engage the input internal gear of the intermediate transmission member with the output external gear on the output shaft. Furthermore, it is also difficult to fit one end of the stopper into the groove of the intermediate transmission member which is supported at the distal side of the main body, and difficult to fasten the stopper to the main body by the screw.

In view of the above, there is thus an unsolved need for a power transmission device that is easy to assemble and install in the main body.

Figure 2:
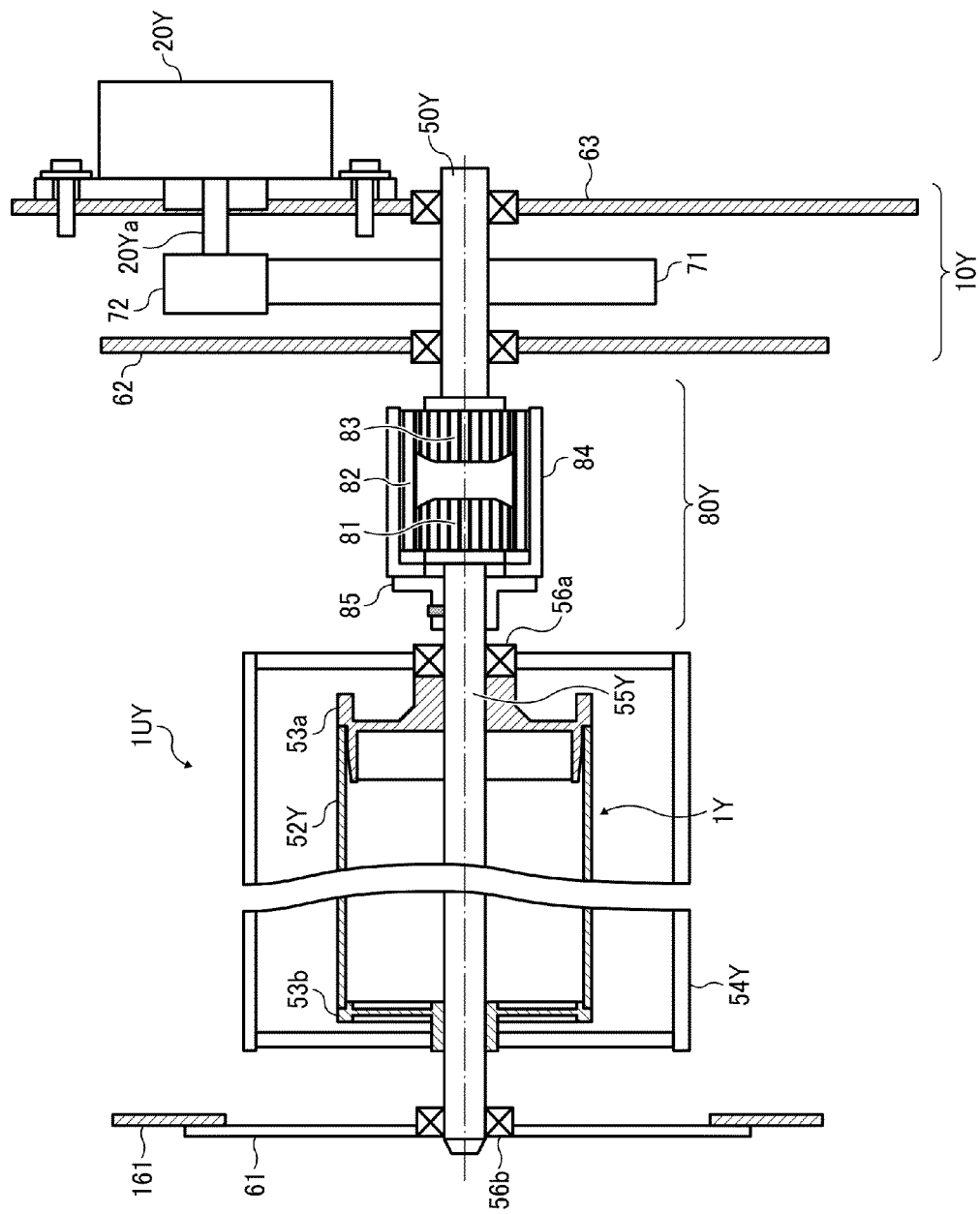
FIG. 2 is a perspective view schematically illustrating a photosensitive-drum driving unit employed in the image forming apparatus of FIG. 1.

With reference to FIG. 2, a description is provided of characteristics of the present disclosure.

FIG. 2 is a cross-sectional view schematically illustrating a photosensitive-drum driving unit employed in the image forming apparatus of FIG. 1 according to an illustrative embodiment of the present disclosure.

It is to be noted that the photosensitive drums 1Y, 1M, 1C, and 1Bk all have the same configuration as all the others, differing only in the color of toner employed. Thus, the description is provided of a photosensitive-drum driving unit to drive the photosensitive drum 1Y as an example.

A photosensitive drum assembly 1UY includes the photosensitive drum 1Y and a frame 54Y made of resin. The photosensitive drum 1Y as a rotary body is held by the frame 54Y. When there is a need to replace or remove the photosensitive drum 1Y, the entire photosensitive drum assembly 1UY is moved and installed. The photosensitive drum 1Y is composed of a cylindrical drum main body (hereinafter referred to simply as drum main body) 52Y, a disk-shaped first drum flange 53a at the back, and a disk-shaped second drum flange 53b at the front. The second drum flange 53b at the front and the first drum flange 53a at the back are fitted to each end of the drum main body 52Y.

A drum shaft 55Y (rotary shaft) is fitted to a center of the second drum flange 53b and the first drum flange 53a. The drum shaft 55Y is rotatably supported by a shaft bearing 56a disposed on the frame 54Y of the photosensitive drum assembly 1UY and a shaft bearing 56b disposed on a first plate 61 as a mounting plate. The drum shaft 55Y is a metal shaft having an external diameter of approximately 10 mm.

After the photosensitive drum assembly 1UY is installed in the main body 100, the first plate 61 is fastened to a main body frame 161 of the main body 100 at the front side by a screw, for example.

According to the present illustrative embodiment, a photosensitive-drum driver section 10Y and a two-stage coupling 80Y as a power transmission device constitute the photosensitive-drum driving unit.

The photosensitive-drum driver section 10Y includes a drive motor 20Y, a motor shaft 20Ya of the drive motor 20Y, a motor-shaft gear 72 that rotates integrally with the motor shaft 20Ya, a drive-shaft gear 71 that rotates integrally with a drive shaft 50Y. The drive motor 20Y is attached to a third frame 63 of the main body 100 of the image forming apparatus. The motor-shaft gear 72 is constituted of an external gear and meshes with the drive-shaft gear 71 which is also an external gear. The drive-shaft gear 71 is fixed to the drive shaft 50Y and does not rotate. The drive-shaft gear 71 transmits a rotary driving force from the drive motor 20Y to the drive shaft 50Y via the motor-shaft gear 72. The drive shaft 50Y is rotatably supported by a shaft bearing attached to the third frame 63 and a shaft bearing attached to a second frame 62 of the main body 100 of the image forming apparatus.

The drive shaft 50Y is a metal shaft having an external diameter of approximately 10 mm. According to the present illustrative embodiment, the drum shaft 55Y and the drive shaft 50Y employ a metal shaft having an external diameter of approximately 10 mm Thus, the shaft stiffness is high, and an amount of deformation or flexibility is small relative to the resin frame 54Y of the photosensitive drum assembly 1UY With this configuration, the photosensitive drum assembly 1UY is reliably supported so that low-frequency vibration is difficult to occur during image formation, hence preventing unevenness of image density, also known as banding which appears periodically in an image.

Although advantageous, manufacturing errors and assembly errors may cause misalignment of shaft center and axis declination between the drum shaft 55Y and the drive shaft 50Y. While misalignment of shaft center and axis declination are present and the drum shaft 55Y and the drive shaft 50Y are fixedly connected using a screw or the like or using a coupling with a small tolerance range of error, a significant reaction force is generated on each shaft, thereby causing deformation of the photosensitive drum assembly 1UY and large vibration. It is to be noted that the photosensitive drum assembly 1UY may also include, in addition to the photosensitive drum 1Y, the development device 9Y with the development roller, the charging device 2Y, the charge erasing lamp 3Y, and the cleaning device 4Y. In such a large photosensitive drum assembly, positioning accuracy upon assembly is difficult to achieve, and misalignment of shaft center and axis declination tend to increase.

In view of the above, the two-stage spline coupling is employed to connect the drum shaft 55Y and the drive shaft 50Y in the present illustrative embodiment. The two-stage spline coupling is known to provide a wide range of error tolerance.

The two-stage coupling 80Y includes two spline couplings including a first external gear 83 as a first stage spline coupling and a second external gear 81 as a second stage spline coupling. The first external gear 83 is a spline coupling at the first stage on the drive side and disposed on the drive shaft 50 which is a device on the drive side. The first external gear 83 is manufactured through machining by metal or sintered. The first external gear 83 is press fit to the drive shaft 50Y or is directly formed on the drive shaft 50Y.

The second external gear 81 is a spline coupling at the second stage on the driven side and disposed on the rear end of the drum shaft 55Y on the driven side. The two-stage coupling 80Y also includes a tubular intermediate transmission member 84. The intermediate transmission member 84 includes internal teeth 82 formed on the inner circumferential surface thereof. The internal teeth 82 of the intermediate transmission member 84 mesh with the first external gear 83 and the second external gear 81, thereby constituting the first-stage spline coupling and the second-stage spline coupling.

The intermediate transmission member 84 is held by the second external gear 81. As the photosensitive drum assembly 1UY is pulled out from the main body 100, the first external gear 83 on the drive shaft 50Y is separated from the intermediate transmission member 84. Accordingly, the intermediate transmission member 84 is removed from the main body 100 together with the photosensitive drum assembly 1UY while the intermediate transmission member 84 is held by the second external gear 81. As the photosensitive drum assembly 1UY is moved towards the photosensitive-drum driving unit in an axial direction such as when the photosensitive drum assembly 1UY is installed in the main body 100, the first external gear 83 on the drive shaft 50Y is inserted into the intermediate transmission member 84 while meshing with the internal teeth 82 of the intermediate transmission member 84. Accordingly, the drive shaft 50Y and the drum shaft 55Y are connected.

Figure 3:
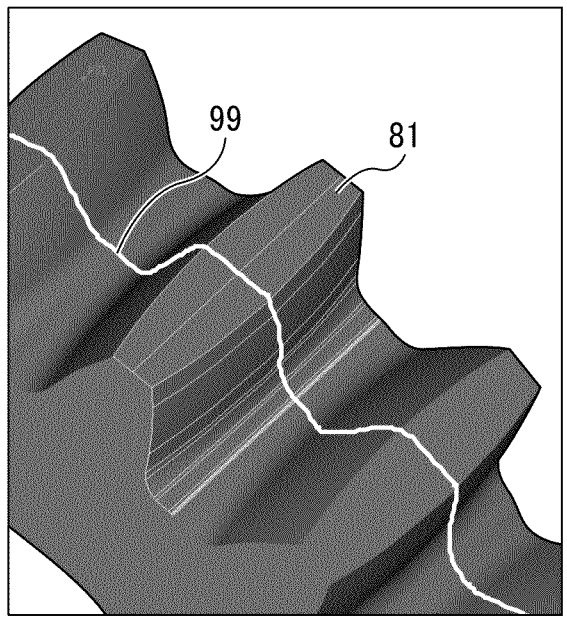
FIG. 3 is a partially enlarged perspective view schematically illustrating teeth of a second external gear, according to an illustrative embodiment of the present disclosure.

FIG. 3 is a partially enlarged perspective view schematically illustrating teeth of the second external gear 81.

As illustrated in FIG. 3, the teeth of the second external gear 81 are crowned. According to the present illustrative embodiment, crowning refers to crowning in a direction of tooth thickness. More specifically, with reference to FIG. 3, the teeth of the second external gear 81 are crowned such that the tooth thickness at the center of the face width is at its maximum and the tooth thickness at both ends in the direction of the face width is at its minimum. Similar to the second external gear 81, teeth of the first external gear 83 are also crowned.

The second external gear 81 and the first external gear 83 include crowned teeth, and the thickness of the crowned teeth in the pitch circle direction changes in the axial direction. The teeth of the second external gear 81 and the first external gear 83 mesh with the internal teeth 82 of the intermediate transmission member 84 on a predetermined effective tooth face (i.e., at the center of the face width). With this configuration, the external gear and the internal gear can tolerate axis declination without producing rotation transmission errors. There are two meshing portions that can tolerate the axis declination (i.e., the second external gear 81 and the internal teeth 82, and the first external gear 83 and the internal teeth 82). With adequate backlash between the internal gear and the external gear, misalignment of shaft center can be tolerated by inclination of the intermediate transmission member 84 even when the shaft centers are not aligned.

As described above, with the two-stage spline coupling, the intermediate transmission member 84 can swingably move in accordance with the axial errors, thereby absorbing deviations between the rotation center axis of the first external gear 83 and the rotation center axis of the second external gear 81. According to the present illustrative embodiment, rotary driving power can be transmitted without changing the angular velocity and without producing the axial reaction force between two parallel shafts which are not on the same straight line.

In FIG. 3, reference numeral "99" refers to a parting line at which two halves of the mold meet. In the event in which the second external gear 81 and the first external gear 83 are made of resin, the second external gear 81 and the first external gear 83 are manufactured through injection molding process. As described above, the second external gear 81 and the first external gear 83 have crowned teeth. In order to produce such crowned teeth through injection molding, it is necessary to split the mold at a portion where the tooth thickness is at its maximum. When producing the external gears through injection molding using resin, as illustrated in FIG. 3, the parting line 99 is located at the center of tooth at which the tooth thickness is at its maximum in the axial direction of the tooth.

FIGS. 4A through 4D are schematic diagrams illustrating the two-stage coupling 80Y, according to an illustrative embodiment of the present disclosure.

Figure 4A:
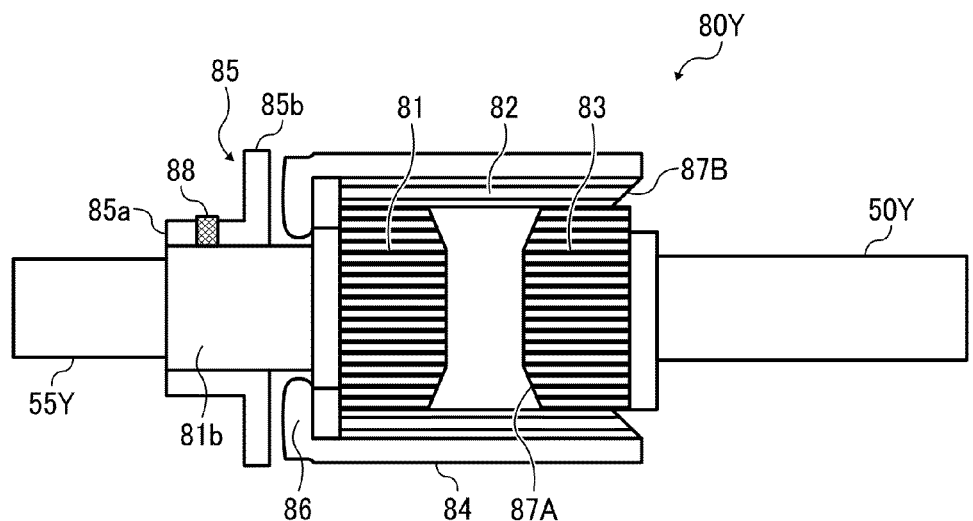
FIG. 4A is a cross-sectional view schematically illustrating a two-stage coupling according to a first illustrative embodiment of the present disclosure.
Figure 4B:
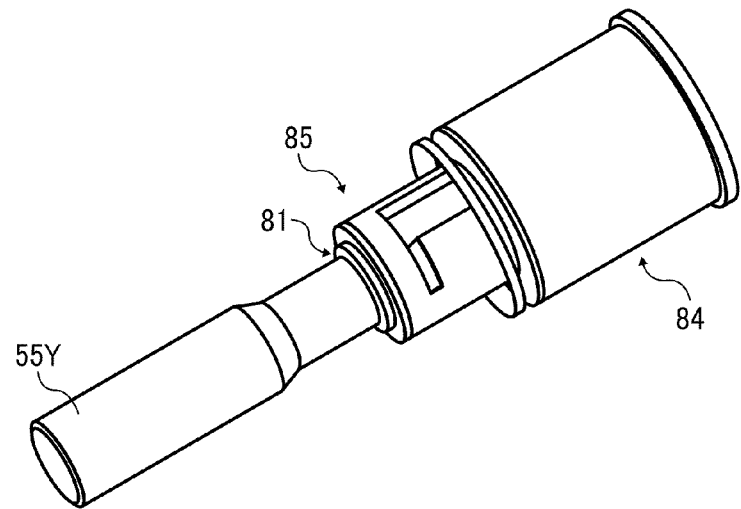
FIG. 4B is a perspective view schematically illustrating an intermediate transmission member and a drum shaft in an engaged state.

As illustrated in FIG. 4A, the second external gear 81 as a coupling (also referred to as a retaining coupling) that holds the intermediate transmission member 84 includes a tubular member 81b which is press fit to the drum shaft 55Y. The tubular member 81b serves as an attachment portion press fit to the drum shaft 55Y. The outer diameter of the second external gear 81 is larger than the outer diameter of the tubular member 81b. The intermediate transmission member 84 includes a flange 86 substantially at the front end (the left end portion in FIG. 4A) of the intermediate transmission member 84. The flange 86 faces the second external gear 81 and extends inward. More specifically, the flange 86 faces the surface of the second external gear 81 on the tubular member 81b side, thereby preventing the intermediate transmission member 84 from falling off from the second external gear 81.

The tubular member 81b includes a stopper 85 to prevent the intermediate transmission member 84 from falling off from the tubular member 81b. The stopper 85 includes a tubular retainer 85a (hereinafter referred to simply as retainer 85a) and a flange 85b. The internal diameter of the retainer 85a is substantially the same as the external diameter of the tubular member 81b. The flange 85b extends outward from the end of the retainer 85a on the second external gear 81 side. The flange 85b faces the flange 86 of the intermediate transmission member 84 with a predetermined space therebetween, thereby preventing the intermediate transmission member 84 from falling off from the tubular member 81b. With this configuration, the intermediate transmission member 84 is interposed between the second external gear 81 and the stopper 85 so that the intermediate transmission member 84 is reliably held and prevented from getting disengaged from the second external gear 81.

The space between the flange 85b of the stopper 85 and the flange 86 of the intermediate transmission member 84 is configured in consideration of an amount by which the intermediate transmission member 84 moves to absorb axial deviation between the drive shaft 50Y and the drum shaft 55Y. In the present illustrative embodiment, the amount of axial deviation between the drive shaft 50Y and the drum shaft 55Y is approximately 0.5 mm. Considering the amount by which the intermediate transmission member 84 moves to absorb the axial deviation, the space between the flange 86 and the flange 85b is set to approximately 1 mm. As described above, when the space between the flange 86 and the flange 85b is set in consideration of the amount by which the intermediate transmission member 84 moves to absorb the axial shift between the drive shaft 50Y and the drum shaft 55Y, the flange 85b does not hinder the intermediate transmission member 84 from moving.

Figure 5A:
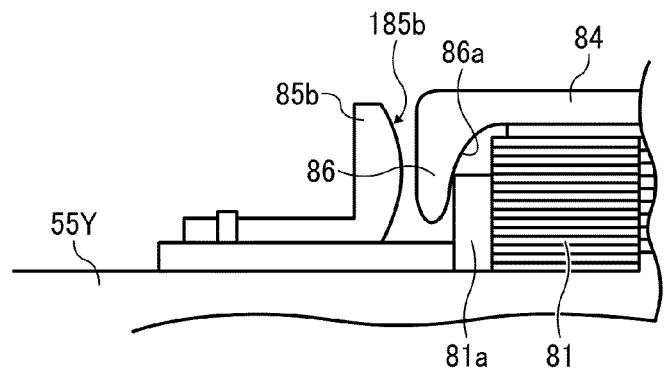
FIGS. 5A through 5C are partially enlarged diagrams schematically illustrating the stopper and a configuration around the stopper.
Figure 5B:
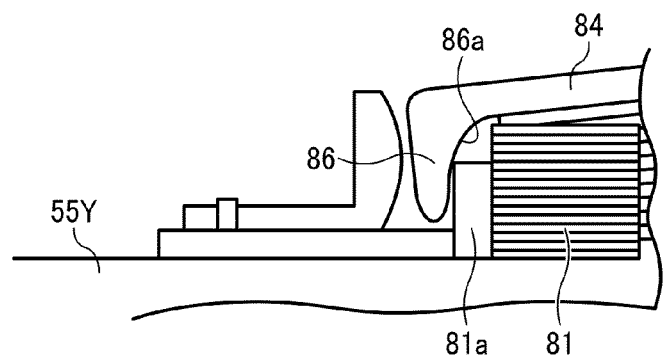
Figure 5C:
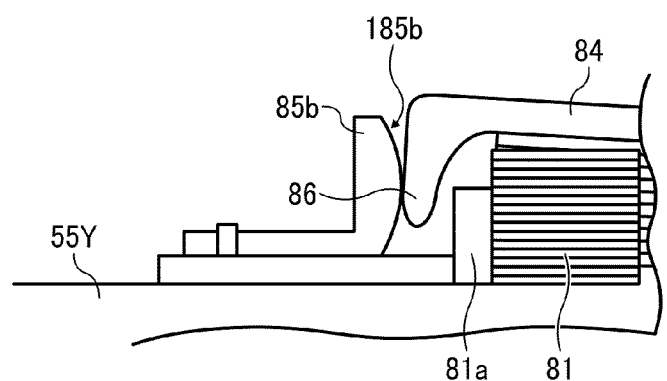
Figure 6:
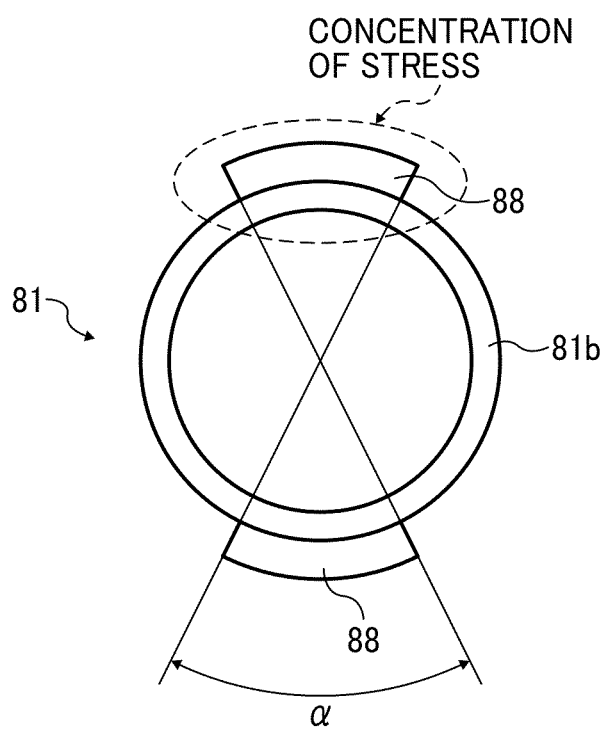
FIG. 6 is a cross-sectional view schematically illustrating a tubular portion as viewed along an axial direction.

FIGS. 5A through 5C are partially enlarged diagrams schematically illustrating a structure near the flange 86.

As illustrated in FIG. 5A, the flange 86 includes a curved surface 86a facing the second external gear 81. The second external gear 81 includes a contact portion 81a that contacts the curved surface 86a of the flange 86. According to the present illustrative embodiment, the surface of the flange 86 with which the contact portion 81a comes into contact is curved, that is, the contact portion 81a contacts the curved surface 86a, thereby moving smoothly the contact portion 81a on the curved surface 86a of the flange 86 when the intermediate transmission member 84 moves. With this configuration, the intermediate transmission member 84 is prevented from getting caught by the contact portion 81a when the intermediate transmission member 84 moves. The intermediate transmission member 84 can be inclined to an angle at which the intermediate transmission member 84 can absorb the axial deviation of the shafts.

As illustrated in FIG. 5A, an opposed surface 185b of the flange 85b of the stopper 85 facing the flange 86 is curved outward towards the flange 86. As illustrated in FIG. 5C, after the flange 86 contacts the opposed surface 185b of the flange

85*b* when the intermediate transmission member 84 moves, the flange 86 moves smoothly on the opposed surface 185*b*. Accordingly, the flange 86 is prevented from getting caught by the opposed surface 185*b* of the flange 85*b* when the intermediate transmission member 84 moves, thereby allowing the intermediate transmission member 84 to reliably absorb the axial deviation. In the present illustrative embodiment, the opposed surface 185*b* of the flange 85*b* is curved outward. Alternatively, the surface of the flange 86 facing the flange 85*b* may be curved outward.

As illustrated in FIG. 4A, when the photosensitive drum assembly 1UY is installed in the main body 100, the intermediate transmission member 84 is supported by the first external gear 83 and the second external gear 81. However, when the photosensitive drum assembly 1UY is detached from the main body 100, the intermediate transmission member 84 is cantilevered, that is, the intermediate transmission member 84 is held only by the second external gear 81 and tilts by self-weight. In this state, the flange 86 of the intermediate transmission member 84 contacts the flange 85*b*, preventing the intermediate transmission member 84 from tilting beyond the predetermined angle by the self-weight. Accordingly, upon installation of the photosensitive drum assembly 1UY, the first external gear 83 can be inserted to the intermediate transmission member 84, thereby allowing the first external gear 83 to mesh reliably with the internal teeth 82 of the intermediate transmission member 84.

As illustrated in FIG. 4A, a leading end 87A of teeth of the first external gear 83 on the second external gear 81 side has a tapered shape such that the tooth thickness decreases towards the leading end. As described above, the first external gear 83 has crowned teeth. The leading end 87A of teeth of first external gear 83 on the second external gear 81 side has a tapered shape such that the tooth thickness decreases towards the leading end. A leading end 87B of the internal teeth 82 from which the first external gear 83 is inserted has a tapered shape such that the tooth depth decreases towards the leading end, thereby facilitating meshing with the internal teeth 82.

That is, even when the intermediate transmission member 84 is tilted to some degree due to self-weight or the drive shaft 50Y and the drum shaft 55Y are not aligned, the tapered shape of the internal teeth 82 and the tapered shape of the first external gear 83 can guide reliably the first external gear 83 into the intermediate transmission member 84. The phases of the internal teeth 82 and the first external gear 83 may be displaced attributed to backlash between the internal teeth 82 and the second external gear 81, and backlash between the motor-shaft gear 72 and the drive-shaft gear 71. According to the present illustrative embodiment, since the first external gear 83 has the crowned teeth, the teeth of the first external gear 83 can fit between the internal teeth 82 even when the phases of internal teeth 82 and the first external gear 83 are displaced to some degree. With this configuration, the intermediate transmission member 84 rotates, allowing the internal teeth 82 and the first external gear 83 to achieve a proper meshing phase and hence connecting the drive shaft 50Y and the drum shaft 55Y reliably.

With this configuration, the intermediate transmission member 84 swingably moves in the engaged state, thereby absorbing misalignment of shafts and hence preventing rotation transmission errors. Accordingly, highly accurate rotation transmission is achieved. Generation of the shaft reaction force is suppressed when connecting the power transmission device and the photosensitive drum assembly 1UY in a misaligned state, thereby forming an image with accuracy. Installation failure of the photosensitive drum assembly 1UY and damage to the two-stage coupling 80Y attributed to contact between the first external gear 83 and the intermediate transmission member 84 when changing from a disengaged state to an engaged state can be prevented.

Furthermore, only four parts, for example, the first external gear 83, the intermediate transmission member 84, the second external gear 81, and the stopper 85, constitute the connecting portions of the drive shaft 50Y and the drum shaft 55Y capable of preventing axis deviation and axis declination. Such a simple configuration allows a saving of space and facilitates assemblage.

Figure 4C:
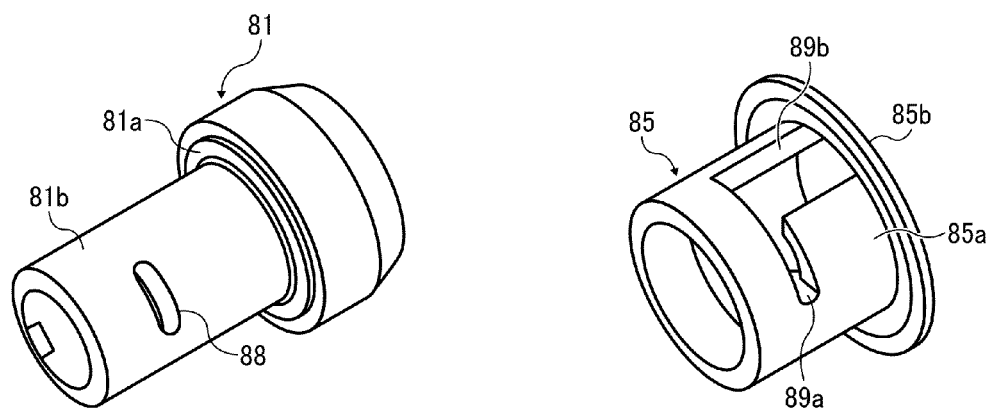
FIG. 4C is a perspective view of the second external gear and a stopper according to the first illustrative embodiment of the present disclosure.
Figure 4D:
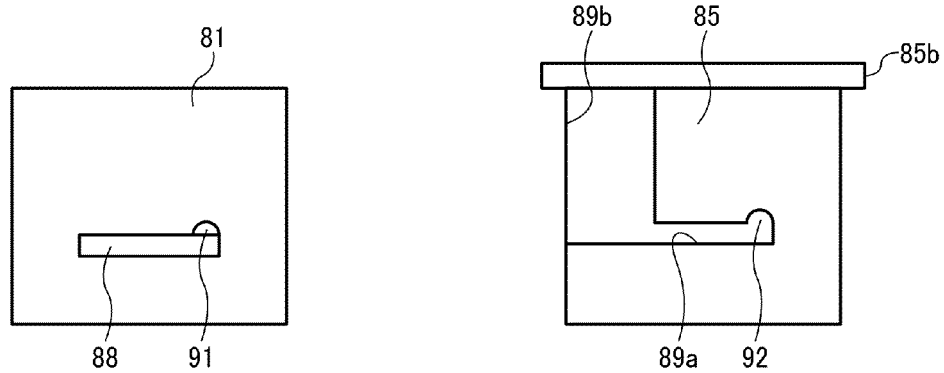
FIG. 4D is a cross-sectional view schematically illustrating the second external gear and the stopper according to an illustrative embodiment of the present disclosure.

As illustrated in FIG. 4C, the retainer 85*a* of the stopper 85 attached to the tubular member 81*b* includes a notch 89*a* and a guide groove 89*b*. A projection 88 extending in the direction of rotation disposed on the tubular member 81*b* is fitted into the notch 89*a*. The guide groove 89*b* guides the projection 88 to the notch 89*a*. There are two projections 88 spaced 180 degrees apart in the direction of rotation. Each projection 88 is in the shape of a substantially circular sector. As illustrated in FIG. 4D, the projection 88 includes a convex portion 91 projecting in the axial direction. The notch 89*a* includes a concave portion 92 to which the convex portion 91 is fitted.

According to the present illustrative embodiment, the second external gear 81 and the internal teeth 82 are engaged such that the intermediate transmission member 84 is inserted from the tubular member 81*b* of the second external gear 81 before the second external gear 81 is fixed to the drum shaft 55Y. Subsequently, the stopper 85 is fitted to the tubular member 81*b*. At this time, when the projection 88 of the tubular member 81*b* is inserted into the guide groove 89*b*, the guide groove 89*b* guides the projection 88, thereby moving the stopper 85 towards the intermediate transmission member 84 in the axial direction. When the projection 88 comes into contact with the end of the guide groove 89*b*, the stopper 85 is rotated to move the projection 88 to fit into the notch 89*a* extending from the guide groove 89*b* in the direction opposite the direction of rotation during power transmission. The stopper 85 is rotated until the convex portion 91 of the projection 88 is fitted to the concave portion 92 of the notch 89*a*.

Accordingly the stopper 85 is attached to the tubular member 81*b*, and the intermediate transmission member 84 is held by the second external gear 81. The tubular member 81*b* of the second external gear 81 holding the intermediate transmission member 84 is press fit to the drum shaft 55Y.

According to the present illustrative embodiment, after the internal teeth 82 of the intermediate transmission member 84 mesh with the second external gear 81 which has not been assembled with the drum shaft 55Y, the stopper 85 is assembled with the tubular member 81*b* of the second external gear 81 which has not been assembled with the drum shaft 55Y, thereby preventing the intermediate transmission member 84 from falling off undesirably. That is, in the present illustrative embodiment, in a state in which there are no interfering parts around before installation of the drum shaft 55Y, thus facilitating assemblage, the intermediate transmission member 84 and the second external gear 81 are meshed and the intermediate transmission member 84 is provided with the stopper 85.

According to the present illustrative embodiment, with the flange 86 and the stopper 85 the intermediate transmission member 84 is reliably held by the second external gear 81. The intermediate transmission member 84 and the second external gear 81 constitute a coupling. With this configuration, when, for example, replacing the photosensitive drum 1Y the coupling consisting of the intermediate transmission member 84 and the second external gear 81 is pulled out from the drum shaft 55Y, and the coupling is simply press fit to the drum shaft of the replaced photosensitive drum. This configuration does not require disassemblage of parts such as the stopper 85 and the intermediate transmission member 84 when replacing the photosensitive drum 1. Thus, the photosensitive drum 1 is replaced with ease.

Furthermore, the intermediate transmission member 84 is held reliably so that the intermediate transmission member 84 does not fall off from either the tubular member 81*b* or the external gear side. Accordingly, when the tubular member 81*b* is press fit to the drum shaft 55Y the intermediate transmission member 84 does not get disengaged from the second external gear 81 undesirably. Furthermore, it is not necessary to pay special attention when press fitting the tubular member 81*b* to the drum shaft 55Y so as not to separate the intermediate transmission member 84 from the second external gear 81, thereby allowing easy handling and facilitating assemblage.

The convex portion 91 of the projection 88 is fitted to the concave portion 92 of the notch 89*a,* thereby stopping rotation of the stopper 85 in the direction of rotation and hence preventing the projection 88 from disengaging from the notch 89*a*.

The length of the notch 89*a* in the axial direction may be shorter than the length of the projection 88 in the axial direction by approximately 0.01 mm to 0.1 mm so that the projection 88 is fitted lightly to the notch 89*a* to stop rotation of the stopper 85.

Preferably, the notch 89*a* of the stopper 85 extends from the guide groove 89*b* in the direction opposite to the direction of rotation at driving. For example, the internal teeth 82 may start rotating before the second external gear 81 at the beginning of driving due to backlash between the internal teeth 82 and the second external gear 81. If the intermediate transmission member 84 is inclined to absorb the shaft misalignment between the drive shaft 50Y and the drum shaft 55Y and a portion of the flange 86 contacts the flange 85*b*, slide resistance in the direction of rotation is applied from the intermediate transmission member 84 to the stopper 85, causing the stopper 85 to rotate relatively in the same direction of rotation as that during driving relative to the tubular member 81*b* of the second external gear 81. At this time, the projection 88 moves relatively in the opposite direction to the direction of rotation at driving relative to the notch 89*a*. Accordingly, the projection 88 moves in such a direction that the projection 88 is fitted to the notch 89*a,* hence preventing the projection 88 from disengaged from the notch 89*a*.

According to the present illustrative embodiment, the second external gear 81, the intermediate transmission member 84, and the stopper 85 are made of resin. Load or strain associated with the photosensitive drum 1 is exerted on the second external gear 81 and the internal teeth 82 of the intermediate transmission member 84 during power transmission. In view of the above, preferably, the second external gear 81 and the intermediate transmission member 84 are made of resin having a Young's modulus of equal to or greater than that of resin used for the stopper 85. Using resin having a Young's modulus of equal to or greater than that of the resin for the stopper 85 can reduce the risk of damage to the gears.

The present inventors performed experiments in which the stopper 85 is attached to the tubular member 81*b* using a snap-fit.

Figure 7A:
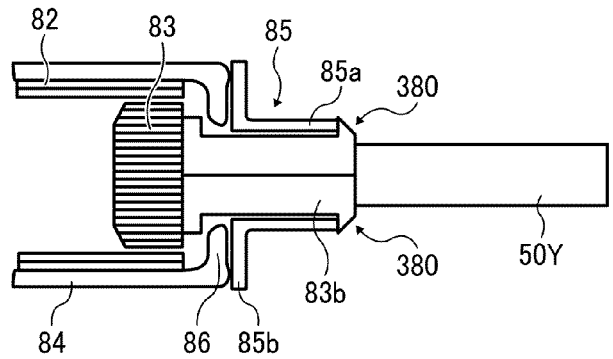
FIG. 7A is a cross-sectional view schematically illustrating a comparative example of the two-stage coupling.
Figure 7B:
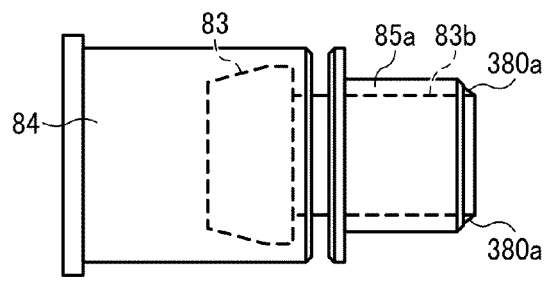
FIG. 7B is a side view of the intermediate transmission member fitted to a first external gear.
Figure 7C:
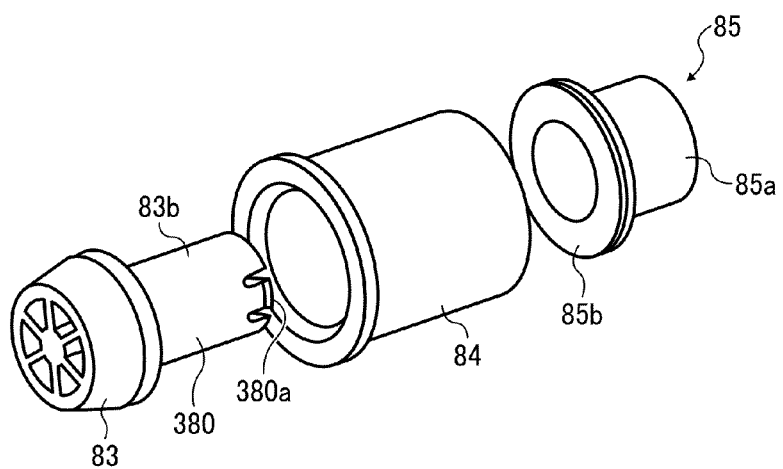
FIG. 7C is an exploded perspective view schematically illustrating the stopper, the intermediate transmission member, and the first external gear.

FIGS. 7A through 7C show a comparative example of the two-stage coupling in a state in which the intermediate transmission member 84 is held by the first external gear 83.

As illustrated in FIG. 7A, an end portion of a tubular member 83*b* of the first external gear 83 includes two snap-fit portions 380 that are spaced 180 degrees apart in the direction of rotation. When fitting the stopper 85 to the tubular member 83*b,* the snap-fit portions 380 elastically deform or flex inward, allowing the stopper 85 to fit to the tubular member 83*b*. After the stopper 85 is fitted to the tubular member 83*b,* the elastic deformation of the snap-fit portions 380 is released and claws 380*a* of the snap-fit portions 380 face the end portion of the retainer 85*a* of the stopper 85, thereby preventing the stopper 85 from separating from the tubular member 83*b*.

In actual use, the tubular member 83*b* of the first external gear 83 is press fit to the drive shaft 50Y so that the snap-fit portions 380 are supported by the drive shaft 50Y from inside, thus preventing the snap-fit portions 380 from flexing. Accordingly, the stopper 85 does not fall off during image forming operation.

When the intermediate transmission member 84 tilts to absorb the shaft misalignment between the drive shaft 50Y and the drum shaft 55Y, the flange 86 may press the flange 85*b* of the stopper 85. Also, in the disengaged state, the intermediate transmission member 84 may tilt due to self-weight, causing the flange 86 to push the flange 85*b* of the stopper 85. Such pressure against the stopper 85 exerted from the intermediate transmission member 84 acts on the claws 380*a* of the snap-fit portions 380.

In a configuration illustrated in FIG. 7A, if the snap-fit portions 380 are difficult to flex inward, the stopper 85 cannot fit to the tubular member 83*b* unless the stopper 85 is pressed hard, complicating efforts to assemble the stopper 85 with ease. In order to make the snap-fit portions 380 to flex inward easily, slits or cuts may be extended. However, the longer the slits, the less fitting ability between the tubular member 83*b* and the drive shaft 50Y, causing the first external gear 83 to rotate idle relative to the drive shaft 50Y. For this reason, the slits cannot be extended. Therefore, the space between slits is narrowed and the snap-fit portions 380 are also narrowed to elastically deform easily. As a result, the length of the claws 380*a* in the direction of rotation is relatively short, increasing the pressure exerted thereto from the intermediate transmission member 84, which results in deformation of the claws 380*a* of the snap-fit portions 380 and degradation of durability.

By contrast, according to the present illustrative embodiment as described above, the stopper 85 includes the notch 89*a*, and the tubular member 81*b* includes the projection 88 which is fitted to the notch 89*a*. The stopper 85 is prevented from falling. More specifically, while the projection 88 is inserted to the guide groove 89*b*, the stopper 85 is fitted to the tubular member 81*b*. After the stopper 85 is fitted to the tubular member 81*b,* the stopper 85 is rotated so as to move the projection 88 to the notch 89*a*. The projection 88 is fitted to the notch 89*a*. With this configuration, the stopper 85 is fitted to the tubular member 81*b* without pushing the stopper 85 hard against the tubular member side. That is, the stopper 85 is assembled to the tubular member 81*b* with ease.

According to the present illustrative embodiment, the pressure exerted on the stopper 85 from the intermediate transmission member 84 is exerted on the projection 88. As compared with the snap-fit structure, even when the projection 88 is relatively long in the direction of rotation, assemblage is not affected. Accordingly, the length of the projection 88 in the direction of rotation is determined such that the pressure applied to the projection 88 is within a permissible range. Because the tubular member 81*b* includes the projection 88 in the shape of a simple circular sector it is relatively easy to manufacture through injection molding.

Figure 8:
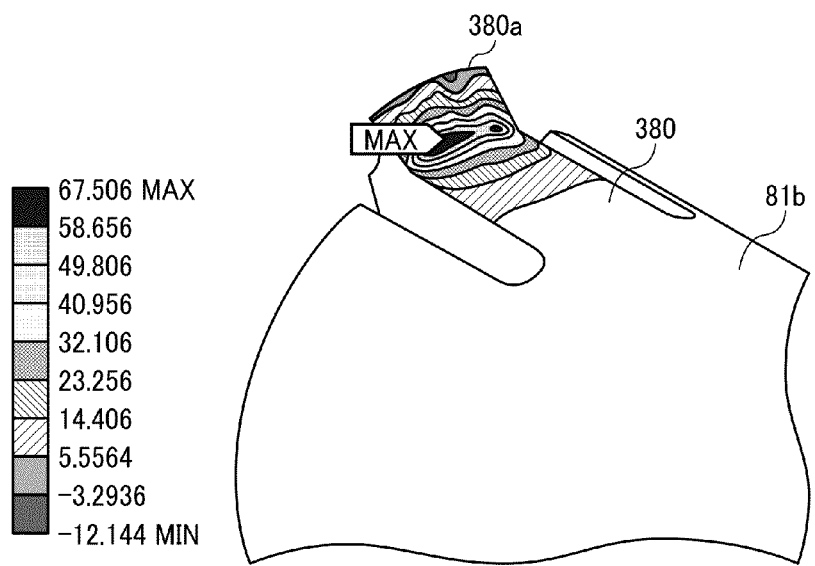
FIG. 8 is a diagram showing a result of an experiment in which stress is applied to a claw portion having a snap-fit structure.
Figure 9:
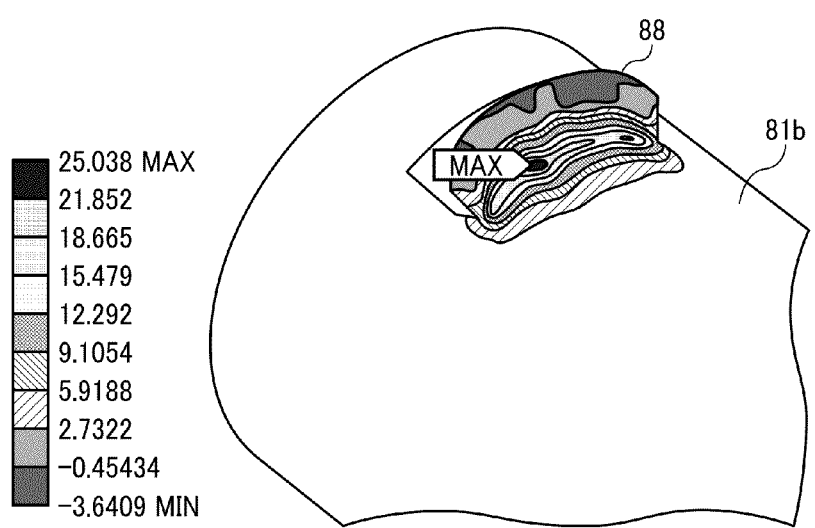
FIG. 9 is a diagram showing a result of an experiment in which stress is applied to a projection of the second external gear.

FIG. 8 is a schematic diagram showing a result of stress exerted on the claws 380*a* having a snap-fit structure. FIG. 9 is a schematic diagram illustrating the result of stress exerted on the projection 88. In FIGS. 8 and 9, the stress was applied for one hour, and the maximum stress in MPa was measured.

As illustrated in FIG. 8, the maximum stress exerted on the claws 380a of the snap-fit was 67.506 MPa. By contrast, as illustrated in FIG. 9 the maximum stress exerted on the projection 88 which is longer in the direction of rotation than the claw 380a of the snap-fit was 25.038 MPa. As compared with the snap-fit structure, the stress is reduced, hence suppressing deformation of the projection 88 and hence increasing durability According to the present illustrative embodiment, the face width is approximately 5 nun, which is less than the face width of 10 mm of a single-stage spline coupling used in a known image forming apparatus. With a narrow face width, rotation transmission properties tend to be good. Furthermore, a relatively narrow face width can provide a saving of space and increase durability because all teeth of the spline joint are designed to mesh. Furthermore, the teeth of the external gear at the photosensitive drum assembly 1UY side and the internal gear at the small-diameter intermediate body side have a face width of approximately 5 mm, and are crowned. Crowning is known to reduce rotation transmission errors. Accordingly, the two-stage spline joint with higher rotation transmission properties is obtained.

Figure 10:
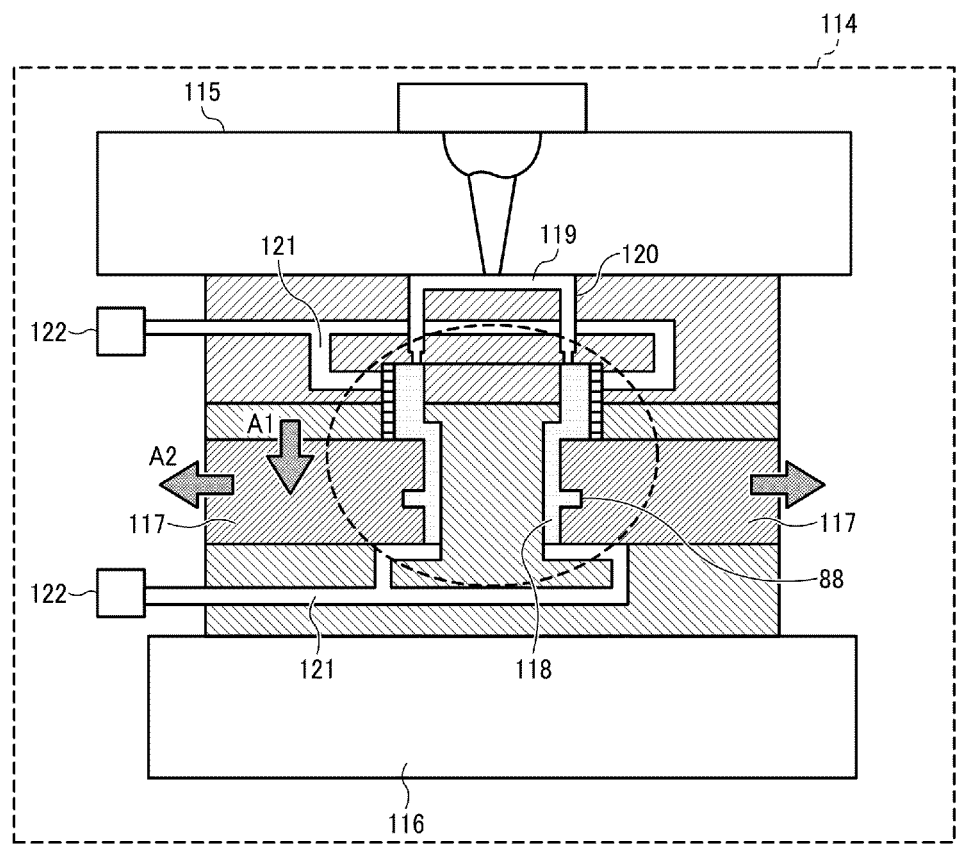
FIG. 10 is a cross-sectional view schematically illustrating a mold used in injection molding of the second external gear.

Next, with reference to FIG. 10, a description is provided of manufacture of the second external gear 81 through injection molding of molten resin.

FIG. 10 is a cross-sectional view schematically illustrating a mold used in injection molding of the second external gear 81.

As illustrated in FIG. 10, a mold 114 includes a stationary upper platen 115 and a movable lower platen 116. The lower platen 116 includes a slidable core 117. A cavity 118 is formed with the upper platen 115, the lower platen 116, and the slidable core 117. The cavity 118 is a space formed mainly into a cylindrical shape, and molten resin is injected into the cavity 118 and cooled to be solidified. Accordingly, the second external gear 81 is formed.

The upper platen 115 includes a path or runner 119 through which the molten resin is supplied and a plurality of pin gates 120 through which the molten resin supplied to the path 119 is injected into the cavity 118. The upper platen 115 and the lower platen 116 include a plurality of communicating holes 121 connected to the cavity 118 The plurality of communicating holes 121 is connected to compressed-air supply sources 122. The internal diameter of the communicating holes 121, more specifically, the internal diameter of the opening of the communicating holes 121 facing the cavity 118 is in a range of from 0.001 to 0.5 mm.

In the present example, in order to form crowned teeth of the second external gear 81, the parting line 99 shown in FIG. 3 is located at the center of tooth in the axial direction thereof, the tooth thickness of which is the largest. More specifically, the parting line 99 shown in FIG. 3 for parting the mold indicates a boundary between the upper platen 115 and the lower platen 116. A half of the tooth profile of the second external gear 81 in the direction of the face width is transferred to the upper platen 115 and the lower platen 116.

The tubular member 81b of the second external gear 81 includes the projection 88. Thus, the projection 88 is formed by the slidable core 117. When removing the molded second external gear 81 from the lower platen 116, the second external gear 81 is removed from the lower platen 116 after the slidable core 117 is slid. The diameter of the peak of the projection 88 is smaller than the root diameter of the second external gear 81 such that the projection 88 does not interfere with the lower platen 116 above the slidable core 117 at which the external teeth of are formed.

When molding the second external gear 81 using the mold 114, the molten resin flows in the path (runner) 119 and is supplied to the pin gate 120 through which the molten resin is injected into the cavity 118. The molten resin injected into the cavity 118 spreads radially from each pin gate 120 in the center.

Consequently, the timing at which the molten resin injected into the cavity 118 reaches the end of the outer circumference side of the cavity 118 differs from the timing at which the molten resin reaches the end of the inner circumference side of the cavity 118. As a result, the amount of molten resin injected into the cavity 118 tends to be insufficient at the end portion of the outer circumference side of the cavity 118 or at the end portion of the inner circumference side of the cavity 118, at whichever side the molten resin arrives late.

The injected molten resin in the cavity 118 is cooled and solidified with time. In the cooling and solidification of the molten resin, when the resin pressure reaches a predetermined value, the compressed-air supply source 122 is driven. Subsequently, the compressed air is blown from the communicating hole 121 into the cavity 118. The communicating hole 121 is formed to face the side surface of the cylindrical-shaped main body. With the compressed air blown against the cavity 118, a sink mark or depression is formed on the side surface of the cylindrical-shaped main body facing the communicating hole 121.

When such a sink mark is formed, the same amount of molten resin corresponding to the capacity of the sink mark is injected additionally into the end portion of the outer circumference side and the inner circumference side of the cavity 118. The position at which the sink mark is formed corresponds to substantially the center of two adjacent pin gates 120 and the end of the outer circumference of the cavity 118 or the end of the inner circumference of the cavity 118, at whichever the injected molten resin arrives late. The position also corresponds to the place at which the amount of injected molten resin tends to be insufficient. With this configuration, the molten resin is supplied additionally to the place at which the amount of the supplied molten resin is insufficient, thereby adjusting the variation in the amount of supplied molten resin at the end of the outer circumference of the cavity 118 and the inner circumference of the cavity 118.

Furthermore, this configuration also prevents wavy patterns or depression appearing on the tooth profile of the second external gear 81. Accordingly, a molded product, i.e., a cylindrical-shaped plastic product having an external gear molded with accuracy is obtained.

It is to be noted that by adjusting the driving timing and output of the compressed-air supply source 122 the amount of compressed air to be supplied and supply timing can be adjusted as needed. Accordingly, the area and depth of the sink mark or depression can be adjusted. As a result of adjustment of the capacity of the sink mark or depression, the amount of molten resin to be injected additionally into the end portion of the outer circumference side and the end portion of the inner circumference side of the cavity 118 can be adjusted. This adjustment prevents more reliably wavy patterns or depressions appearing on the second external gear 81, thereby obtaining gear teeth molded with higher precision.

Furthermore, because the inner diameter of the communicating hole 121 is relatively small, i.e., in a range of from 0.001 mm to 0.5 mm, the molten resin injected into the cavity 118 is prevented from getting into the communicating hole 121, which then prevents burrs or flash which generally occurs when the molten resin gets into the communicating hole 121.

According to the present illustrative embodiment, two projections 88 are formed spaced 180 degrees apart. By forming the plurality of projections 88 on the tubular member 81b at equal intervals in the circumferential direction thereof, deviation in mold shrinkage is difficult to occur and teeth are molded with accuracy.

After the second external gear 81 is formed, the lower platen 116 is moved in a direction indicated by arrow A1 to open the mold. Subsequently, the slidable core 117 is moved in a direction indicated by arrow A2. When the mold is opened, the second external gear 81 held by the lower platen 116 is pulled up, thereby removing the molded second external gear 81 from the lower platen 116. As described above, because the distance from the axial center of the peak of the projection 88 is substantially shorter than the distance from the axial center of the root of external teeth, the second external gear 81 is removed from the lower platen 16 without having the projections 88 striking the lower platen 116.

Figure 11:
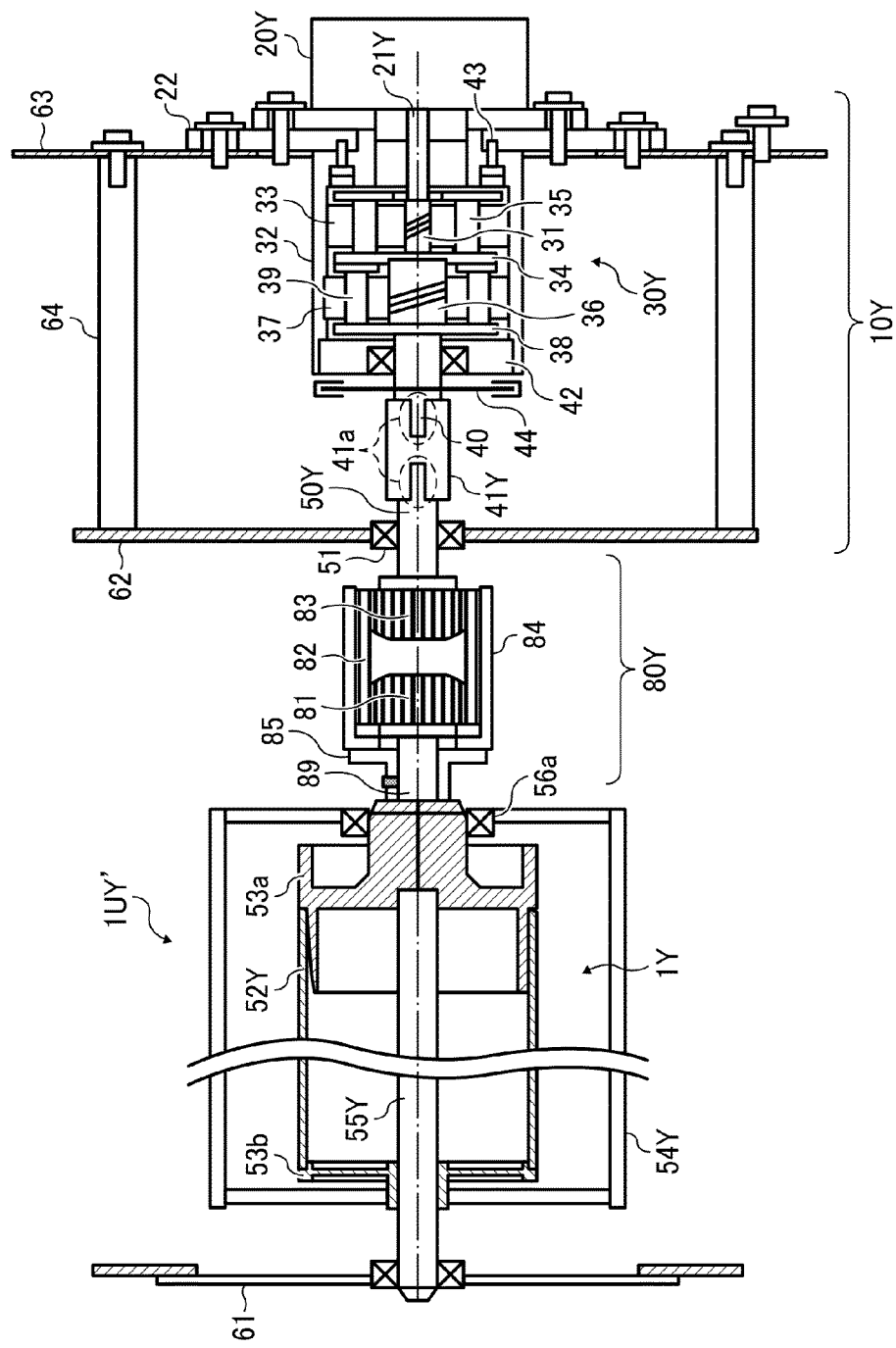
FIG. 11 is a schematic diagram illustrating a variation of the photosensitive-drum driving unit.

With reference to FIG. 11, a description is provided of a variation of the illustrative embodiment of the present disclosure.

FIG. 11 is a schematic diagram illustrating a variation of the photosensitive-drum driving unit.

The variation of photosensitive-drum driving unit includes the two-stage coupling 80Y having the same configuration as the photosensitive-drum driving unit shown in FIG. 2, but employs a photosensitive drum assembly 1UY' and a photosensitive-drum driver section 10Y' having different configurations from the photosensitive-drum driving unit shown in FIG. 2.

As illustrated in FIG. 11, the photosensitive-drum driver section 10Y includes the drive motor 20Y, a planetary gear decelerator 30Y, a joint 41Y, and the drive shaft 50Y. The planetary gear decelerator 30Y includes an output shaft 40. The output shaft 40 is connected and fixed to the drive shaft 50Y by the joint 41Y A shaft bearing 51 is press fit to the drive shaft 50Y. Via the shaft bearing 51, the drive shaft 50Y is supported and positioned in place by the second frame 62 constituting a part of the main body housing. After the photosensitive drum assembly 1UY is installed, the photosensitive drum 1Y is supported, via the two-stage coupling 80 and the drum shaft 55Y, by a shaft bearing fixed to the first plate 61 as a mounting plate.

Next, a description is provided of the configuration of the planetary gear decelerator 30Y.

In the present variation, the planetary gear decelerator 30Y employs a two-stage 2K-H type planetary gear mechanism. In this example, the planetary gear mechanism includes two stages. Alternatively, depending on the required deceleration ratio, the planetary gear mechanism may include three or more stages.

A first sun gear 31 is directly formed on a motor output shaft 21Y of the drive motor 20Y. A first planetary gear 33 of the first stage supported by a first carrier 34 of the first stage meshes with an internal gear 32 fixed to the first sun gear 31 and a bracket 22, and revolves around the periphery of the first sun gear 31. According to the present illustrative embodiment, a plurality of planetary gears, for example, three first planetary gears 33 are concentrically disposed for rotation balance and load dispersal. The number of planetary gears is not limited to three. More than three planetary gears can be used. Each of the first planetary gears 33 is supported by a first carrier pin 35 disposed on the first carrier 34 such that each of the first planetary gears 33 can rotate itself.

The plurality of first planetary gears 33 meshes with the first sun gear 31 and the internal gear 32 so that each of the first planetary gears 33 rotates while revolving around the first sun gear 31. The first carrier 34 supporting the first planetary gears 33 rotates slower than the rotation of the first sun gear 31, thereby obtaining a desired deceleration ratio at the first stage.

Next, a second sun gear 36 serves as an input for the second stage of the deceleration mechanism. The second sun gear 36 is disposed at the center of rotation of the first carrier 34. It is to be noted that the first carrier 34 does not include a rotary supporting portion, thereby allowing the first carrier 34 to freely float (rotate). Similarly, a plurality of second planetary gears 37 of the second stage meshes with the second sun gear 36 of the second stage and the internal gear 32 extending to the second stage, and is supported by a second carrier 38 of the second stage. The internal gear of the first stage and the internal gear of the second stage are constituted as a single integrated unit as the internal gear 32. The second planetary gears 37 revolve around the periphery of the second sun gear 36.

Each of the second planetary gears 37 is supported by a second carrier pin 39 disposed on the second carrier 38 such that each of the second planetary gears 37 can rotate itself and revolve around the periphery of the second sun gear 36. The second carrier 38 of the second stage which is the last stage includes the output shaft 40 at the center of rotation of the second carrier 38. The output shaft 40 is connected to the drive shaft 50Y via the joint 41Y which is a hollow cylinder. The output shaft 40 of the second carrier 38 is supported by a shaft bearing press-fit to an internal gear cap 42 positioned in place by the internal gear 32.

The internal gear cap 42 is fitted to the inner circumference of the internal gear 32 and positioned in place. Accordingly, deviation of coaxiality between the output shaft 40 and the center of axis of the internal gear can be minimized. The joint 41Y is a hollow cylinder. The diameter of the drive shaft 50Y and the diameter of the output shaft 40 of the planetary gear decelerator are the same. The joint 41Y is press fit to the drive shaft 50Y. The joint 41Y includes a notch 41a substantially at the center thereof The output shaft 40 is connected and fixed to the joint 41Y by a frictional force between a portion of the joint 41 pressed and bent by a screw. As described above, the motor output shaft 21Y of the drive motor 20Y is supported by the bracket 22.

The internal gear 32 is fixed to the bracket 22 by a screw 43. The bracket 22 fixedly holds the internal gear 32 and the drive motor 20Y. The bracket 22 is fixed to the third frame 63 using a screw. The third frame 63 is supported and positioned in place by a stud 64 fitted to the second frame 62 at the back side. The center of the shaft of the internal gear 32 at the drive motor side includes a hollow, cylinder-shaped boss. The inner circumference of the hollow, cylinder-shaped boss and the shaft bearing provided at the motor output shaft 21Y side are fitted together, thereby positioning the drive motor 20Y in place. The outer circumference of the hollow, cylinder-shaped boss is fitted to a hole of the bracket 22 and positioned in place. With this configuration, the motor output shaft 21Y, the bracket 22, and the center of the output shaft 40 of the planetary gear decelerator are coaxially provided on the same axis, and the coaxiality error between these parts due to dimensional variations can be minimized, if not prevented entirely. In other words, the axial centers of the devices from the motor output shaft 21Y to the drive shaft 50Y are coaxially disposed on the same axis, and the deviation of the coaxiality between these parts due to dimensional variations can be reduced, if not prevented entirely.

Furthermore, a speed detector 44 is also disposed coaxially on the axial center of the internal gear 32, the motor output shaft 21Y, the bracket 22, and the output shaft 40 of the planetary gear decelerator 30Y. The speed detector 44 includes, for example, an encoder and two detectors. The configuration of the speed detector 44 is not limited thereto. The number of detectors may be changed as needed depending on the required control accuracy.

The photosensitive drum 1Y includes the first drum flange 53*a* and the second drum flange 53*b* disposed at each end of the photosensitive drum 1Y. The photosensitive drum 1Y is positioned in place relative to the drum shaft 55Y via the first drum flange 53*a* and the second drum flange 53*b*. More specifically, the second drum flange 53*b* opposite to the drive side includes a hole at the rotation center thereof, through which the drum shaft 55Y penetrates. The drum shaft 55Y is fitted to the hole and positioned in place. The surface of the first drum flange 53*a* opposite to the drive side includes a recessed portion to which the tip of the drum shaft 55Y is fitted. The drum shaft 55Y is fitted to the recessed portion and positioned in place.

A metal shaft 89 is fixed to the other side of the first drum flange 53*a*, that is, the surface at the drive side. The tubular member 81*b* of the second external gear 81 is press fit to the metal shaft 89. The first external gear 83 is formed on the drive shaft 50Y. The first external gear 83 transmits a driving force to the photosensitive drum 1Y. The photosensitive drum 1Y is driven via the internal teeth 82 of the intermediate transmission member 84 and the second external gear 81 press-fit to the metal shaft 89.

Although advantageous, misalignment of shaft center and axis declination between the metal shaft 89 and the drive shaft 50Y may still occur in the above-described configuration attributed to manufacturing and assembly errors in the photosensitive drum assembly 1UY, resulting in a significant reaction force on each shaft. In particular, since the present variation employs a planetary gear system at the driver section of the photosensitive drum, a significant number of parts are used. As a result, the reaction force generated on the shafts at the connecting portion adversely affects meshing of the plurality of gears at the photosensitive-drum driver section. The degree by which imaging quality is degraded tends to be significant. However, in the present variation, with the use of the two-stage spline coupling swingable movement of the intermediate transmission member 84 equipped with the internal teeth 82 absorbs misalignment of shaft centers and axis declination, hence transmitting rotation with high accuracy.

In the present variation, the axial centers of the devices from the motor output shaft 21Y of the photosensitive-drum driver section 10Y to the drive shaft 50Y are coaxially disposed on the same axis, and the deviation of the coaxiality between these parts due to dimensional variations of parts can be reduced, if not prevented entirely. The amount of axial deviation and axis declination to be absorbed is less than that of the above-described illustrative embodiment. Therefore, the present variation is advantageous in that the mating contact area is wide, and the transfer stiffness is high.

As described above, the second external gear 81 holds the intermediate transmission member 84. Alternatively, the first external gear 83 may include a tubular portion to which the intermediate transmission member 84 and the stopper 85 are attached.

[Embodiment 2]

Figure 12:
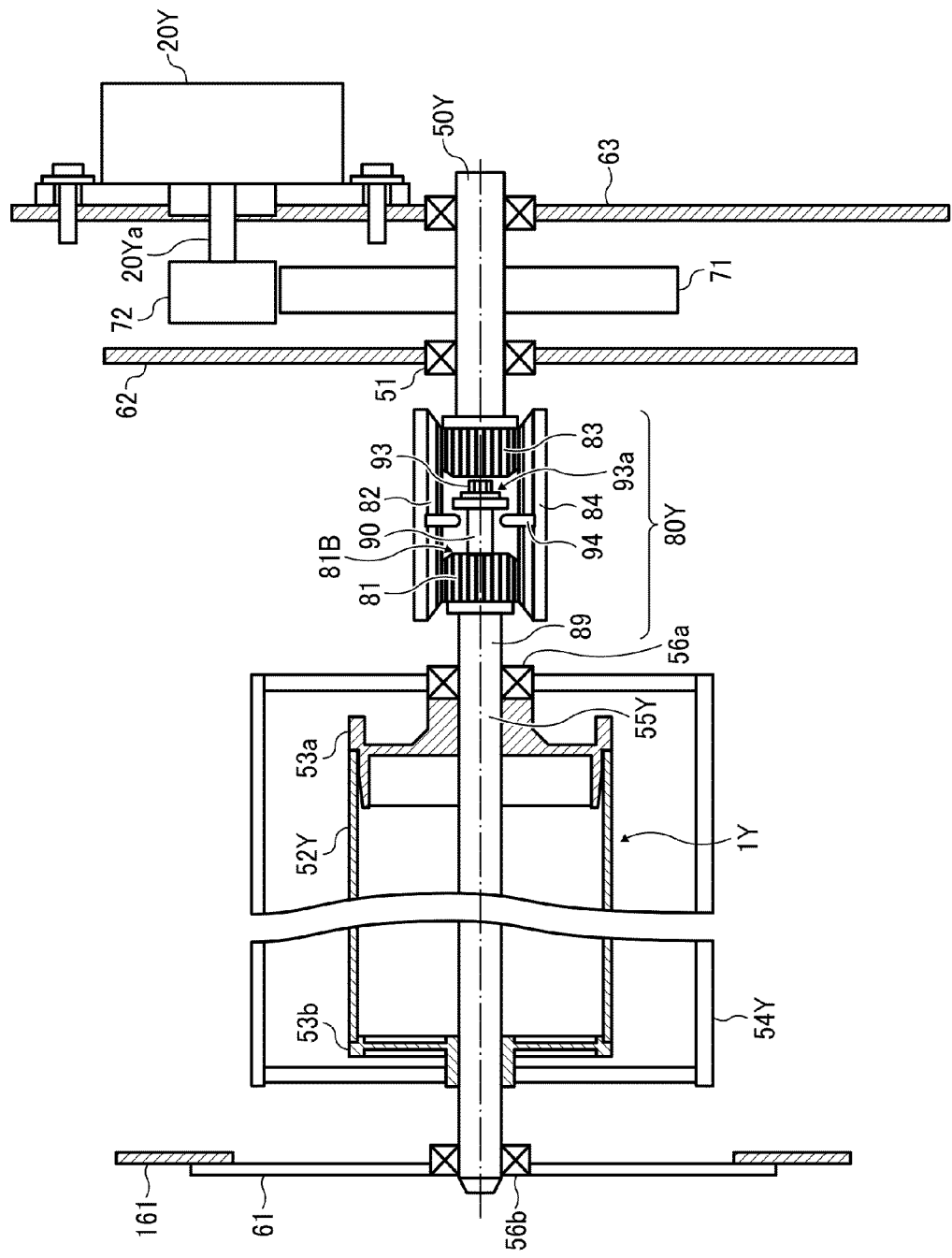
FIG. 12 is a cross-sectional view schematically illustrating the photosensitive-drum driving unit according to a second illustrative embodiment of the present disclosure.

With reference to FIG. 12, a description is provided of another illustrative embodiment of the present disclosure. The basic configuration of an image forming apparatus of the second illustrative embodiment is the same as the image forming apparatus 500 of the first illustrative embodiment. Thus, a description thereof is omitted. The image forming apparatus of the present illustrative embodiment is an electrophotographic color copier.

FIG. 12 is a cross-sectional view schematically illustrating the photosensitive-drum driving unit according to the second illustrative embodiment. In FIG. 12, the configurations of the photosensitive drum assembly 1UY and the photosensitive-drum driver section 10Y are substantially the same as that of the first illustrative embodiment. Thus, the same reference numerals are given to constituent elements corresponding to the constituent elements shown in FIG. 2, and redundant descriptions thereof will be omitted unless otherwise stated.

The photosensitive-drum driving unit shown in FIG. 12 employs a two-stage spline coupling as the two-stage coupling 80Y that connects the photosensitive drum assembly 1UY and the photosensitive-drum driver section 10Y. The two-stage spline coupling is generally known to provide a wide range of error tolerance. The gears according to the illustrative embodiments can be applied to a known single-stage spline coupling.

The two-stage coupling 80Y is constituted of two spline couplings including the first external gear 83 as a first stage spline coupling and the second external gear 81 as a second stage spline coupling. The first external gear 83 is a spline coupling at the first stage on the drive side and disposed on the drive shaft 50 which is a device on the drive side. The first external gear 83 is press fit and fixed to the drive shaft 50Y or is directly formed on the drive shaft 50Y.

The second external gear 81 is a spline coupling at the second stage on the driven side and disposed on the rear end of the drum shaft 55Y on the driven side.

The two-stage coupling 80Y also includes the tubular intermediate transmission member 84. The inner circumferential surface of the intermediate transmission member 84 includes the internal teeth 82. The internal teeth 82 of the intermediate transmission member 84 mesh with the first external gear 83 and the second external gear 81, thereby constituting the first-stage spline coupling and the second-stage spline coupling.

The second external gear 81 and the first external gear 83 include crowned teeth, and the thickness of the crowned teeth in the pitch circle direction changes in the axial direction. The teeth of the second external gear 81 and the first external gear 83 mesh with the internal teeth 82 of the intermediate transmission member 84 on a predetermined effective tooth face (i.e., at the center of the face width).

With this configuration, the external gear and the internal gear can tolerate axis declination without producing rotation transmission errors. There are two mating portions (i.e., the second external gear 81 and the internal teeth 82, and the first external gear 83 and the internal teeth 82) that can tolerate the axis declination. With adequate backlash provided between the internal gear and the external gear misalignment of shaft center can be tolerated by inclination of the intermediate transmission member 84 even when the shaft centers are not aligned.

As described above, with the two-stage spline coupling, the intermediate transmission member 84 can swingably move in accordance with the axial errors, thereby absorbing deviations between the rotation center axis of the first external gear 83 and the rotation center axis of the second external gear 81. According to the present illustrative embodiment, rotary driving power can be transmitted without changing the angular velocity and without producing the reaction force between two parallel shafts which are not on the same straight line.

As illustrated in FIG. 12, the intermediate transmission member 84 has a two-stage structure in which the internal teeth 82 is prevented from falling off from the second external gear 81 by a stopper 90.

The leading end of the teeth of the first external gear 83 in the axial direction has a tapered shape such that the thickness and the tooth depth thereof decrease, thereby facilitating meshing with the internal teeth 82. For example, during retraction of the internal teeth 82 and the intermediate transmission member 84, the phases of the internal teeth 82 and the first external gear 83 may be displaced attributed to changes in the position of the intermediate transmission member 84, backlash between the internal teeth 82 and the second external gear 81, and backlash between the drive-shaft gear 71 and the motor-shaft gear 72.

According to the present illustrative embodiment, since the leading end of the teeth of the first external gear 83 in the axial direction is tapered as described above, small rotation of the intermediate transmission member 84 enables the teeth of the first external gear 83 to mesh between the internal teeth 82 even when the phases of internal teeth 82 and the first external gear 83 are displaced to some degree. With this configuration, the first external gear 83 and the internal teeth 82 can achieve a proper meshing phase, hence connecting the drive shaft 50Y and the drum shaft 55Y as desired.

According to the present illustrative embodiment, the intermediate transmission member 84 swingably moves in the engaged state, thereby absorbing displacement of shafts and hence preventing rotation transmission errors. Highly accurate rotation transmission is achieved. Generation of the shaft reaction force when connecting the power transmission device and the photosensitive drum assembly 1UY in a state in which the shafts are misaligned is suppressed, thereby forming an image with accuracy. Installation failure of the photosensitive drum assembly 1UY and damage to the two-stage coupling 80Y attributed to contact between the first external gear 83 and the internal teeth 82 when changing from the disengaged state to the engaged state can be prevented.

FIGS. 13A through 13D are schematic diagrams illustrating the two-stage coupling 80Y according to an illustrative embodiment of the present disclosure.

Figure 13A:
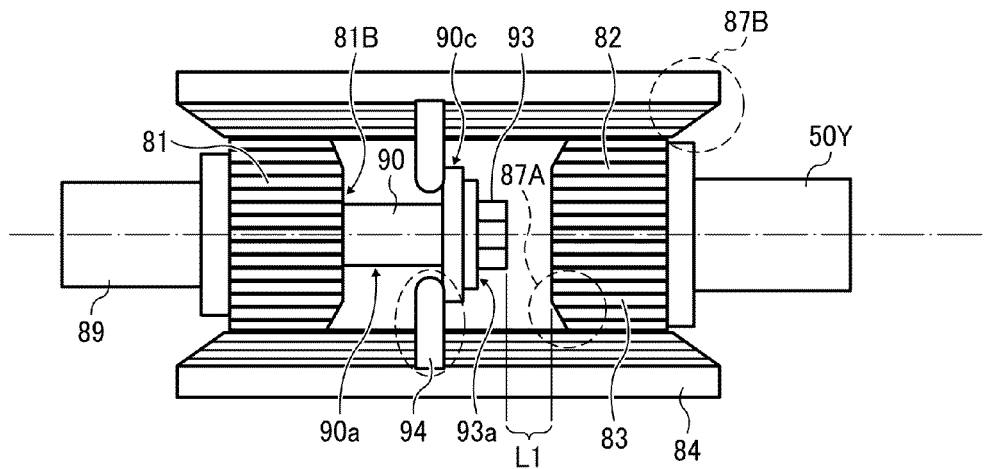
FIG. 13A is a cross-sectional view schematically illustrating a two-stage coupling according to the second illustrative embodiment of the present disclosure.

FIG. 13A is a cross-sectional view illustrating the two-stage coupling 80Y in a state in which the second external gear 81, the first external gear 83, the intermediate transmission member 84, and the stopper 90 are assembled. The second external gear 81 and the first external gear 83 are made of resin and have crowned teeth. A parting line is provided at the center of each teeth in the axial direction.

By contrast, the internal teeth 82 are a spur gear having straight teeth. As described above, the teeth of the second external gear 81 and the first external gear 83 are crowned so that even when the intermediate transmission member 84 tilts due to misalignment, the second external gear 81 and the first external gear 83 can mesh with the internal teeth 82 at the center of the face width.

Furthermore, in order for the intermediate transmission member 84 to tilt more smoothly due to misalignment, the tip of a separation plate 94 disposed substantially at the center of an inner wall surface of the intermediate transmission member 84 in the axial direction has a smooth cylindrical shape as illustrated in FIG. 13A.

As illustrated in FIG. 13A, a leading end 87A of teeth of the first external gear 83 on the second external gear side has a tapered shape such that the tooth depth decreases towards the leading end. A leading end 87B of the internal teeth 82 on the side from which the first external gear 83 is inserted has a tapered shape such that the tooth depth decreases towards the leading end. With this configuration, when the drive shaft 50Y is connected to the two-stage coupling 80Y, the internal teeth 82 and the first external gear 83 can mesh smoothly.

Figure 13B:
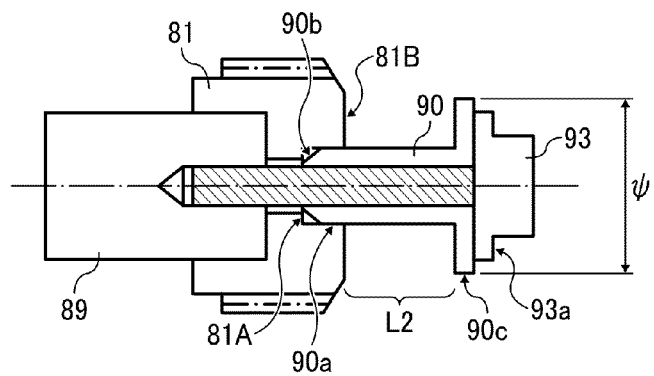
FIG. 13B is a partially enlarged cross-sectional view schematically illustrating a stopper according to the second illustrative embodiment.
Figure 13C:
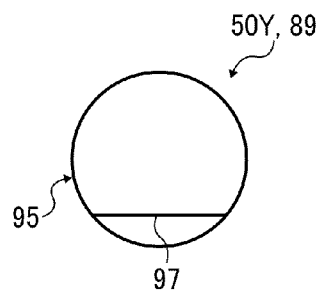
FIG. 13C is a cross-sectional view schematically illustrating an end portion of a drive shaft and a metal shaft as viewed from an axial direction according to the second illustrative embodiment.

As illustrated in FIG. 13B, the stopper 90 is fixed to the metal shaft 89 by a screw 93 in a state in which the stopper 90 is interposed between a flange portion 93a of the screw 93 and the second external gear 81. The axial center of a leading end surface 81B of the second external gear 81 includes a hole 81A through which a small-diameter first portion 90a of the stopper 90 is inserted. The first portion 90a has a cylindrical shape. An end portion of the first portion 90a of the stopper 90 is chamfered, which is referred to as a chamfered portion 90b in FIG. 13A. Upon assembly, the chamfered portion 90b is inserted into the hole 81A and fixed, thereby enhancing assemblage.

A space L2 between a large-diameter second portion 90c of the stopper 90 and the second external gear 81 in the axial direction is long enough for the intermediate transmission member 84 to tilt as described above. The diameter φ of the second portion 90c of the stopper 90 is large enough to provide adequate clearance between the internal teeth 82 and the second portion 90c even when the intermediate transmission member 84 tilts.

The end portion of the drive shaft 50Y and the metal shaft 89 has a non-circular shape in cross section as viewed along the axial direction, thereby preventing undesirable rotation when the first external gear 83 and the second external gear 81 are fitted to the drive shaft 50Y and the metal shaft 89, respectively.

Figure 13D:
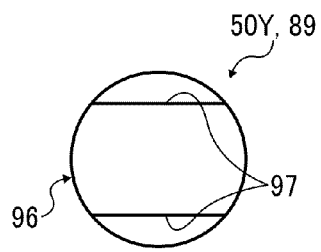
FIG. 13D is a cross-sectional view schematically illustrating another example of the end portion of the drive shaft and the metal shaft.

That is, the shape of the end portion of the drive shaft 50Y and the metal shaft 89 at which the first external gear 83 and the second external gear 81 are fitted, respectively, is substantially D-shaped (hereinafter referred to as a D-shaped portion 95) including a milled plane 97 on one side in cross section as viewed in the axial direction. Alternatively, as illustrated in FIG. 13D, the end portion of the shafts in cross section has a rounded rectangular shape 96 including a pair of opposed milled planes 97 and a pair of curved portions that connect both ends of the milled planes 97.

The first external gear 83 and the second external gear 81 include fitting portions having a noncircular shape in cross-section as viewed in the axial direction to fit with the end portion of the first external gear 83 and the second external gear 81 having the D-shaped portion 95 or the rounded rectangular shape 96. With this configuration, the contact area upon transmission of power is increased, thereby suppressing concentration of stress and enhancing durability. Furthermore, a cyclic speed variation in one rotation cycle and generation of higher-order component thereof are prevented.

Figure 14:
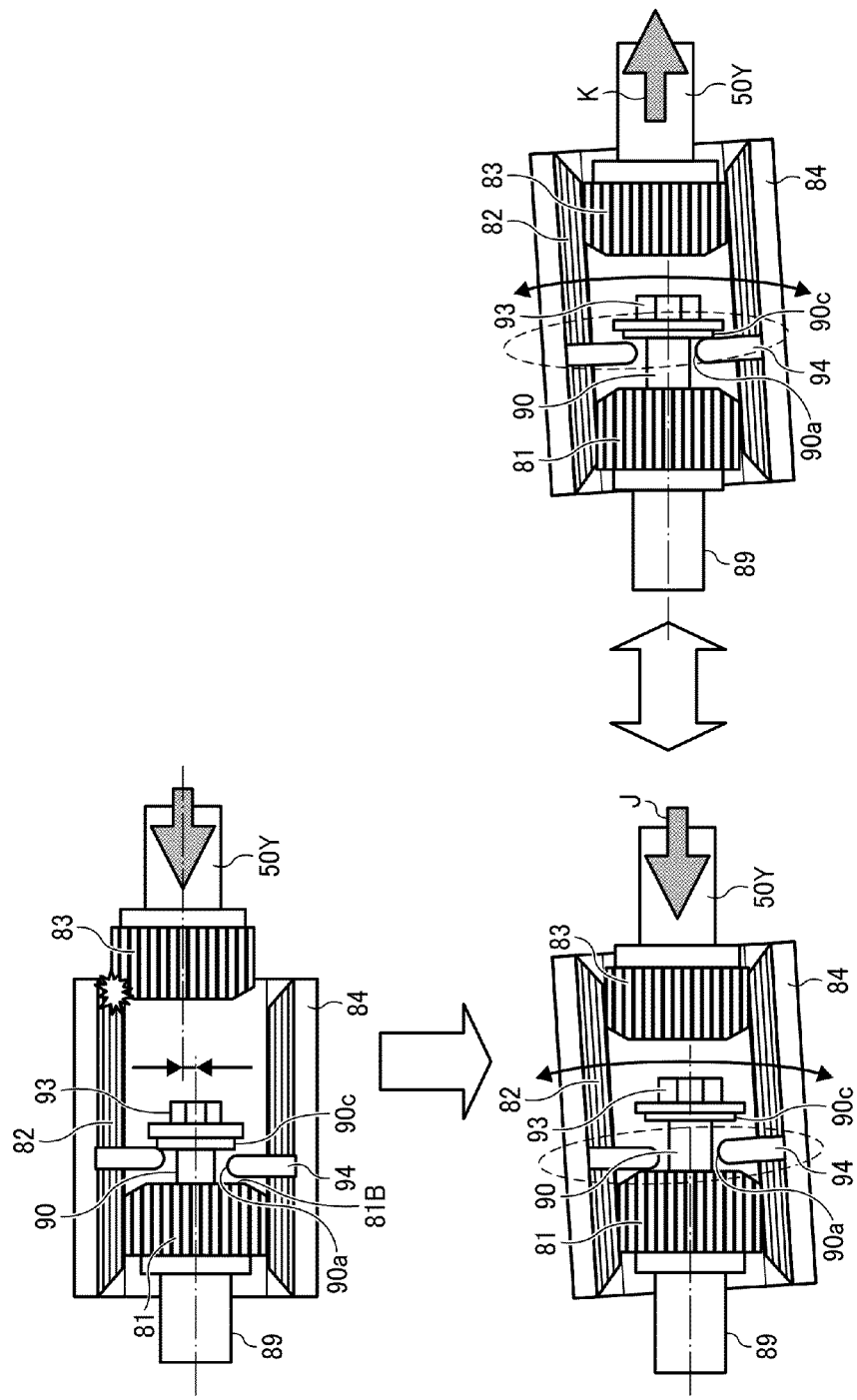
FIG. 14 is a schematic diagram illustrating the stopper according to an illustrative embodiment of the present disclosure.

With reference to FIG. 14, a description is provided of a stopping mechanism of the intermediate transmission member 84 and the stopper 90. As illustrated in FIG. 14, the separation plate 94 contacts the leading end surface 81B of the second external gear 81 in the direction of insertion indicated by arrow J and contacts the second portion 90c of the stopper 90 in the direction of pulling, thereby preventing the intermediate transmission member 84 from falling off from the second external gear 81.

In a case in which the diameter of the internal teeth 82, the second external gear 81, and the first external gear 83 is relatively small, a head portion of the screw 93 may contact the separation plate 94 when the stopper 90 does not have the second portion 90c. This configuration can also prevent the intermediate transmission member 84 from falling. Furthermore, a space L1 between the screw 93 and the first external gear 83 is long enough to prevent the screw 93 and the first external gear 83 from contacting one another even when considering accumulation of manufacturing tolerances of parts.

In the present example, the face width is also approximately 5 mm. The face width of approximately 5 mm enhances rotation transmission properties and durability, and achieves a saving of space, as compared with the face width of approximately 10 mm. Furthermore, the teeth of the second external gear 81 are crowned. Crowning is known to reduce rotation transmission errors. Accordingly, the two-stage spline joint with higher rotation transmission properties is obtained.

Figure 15:
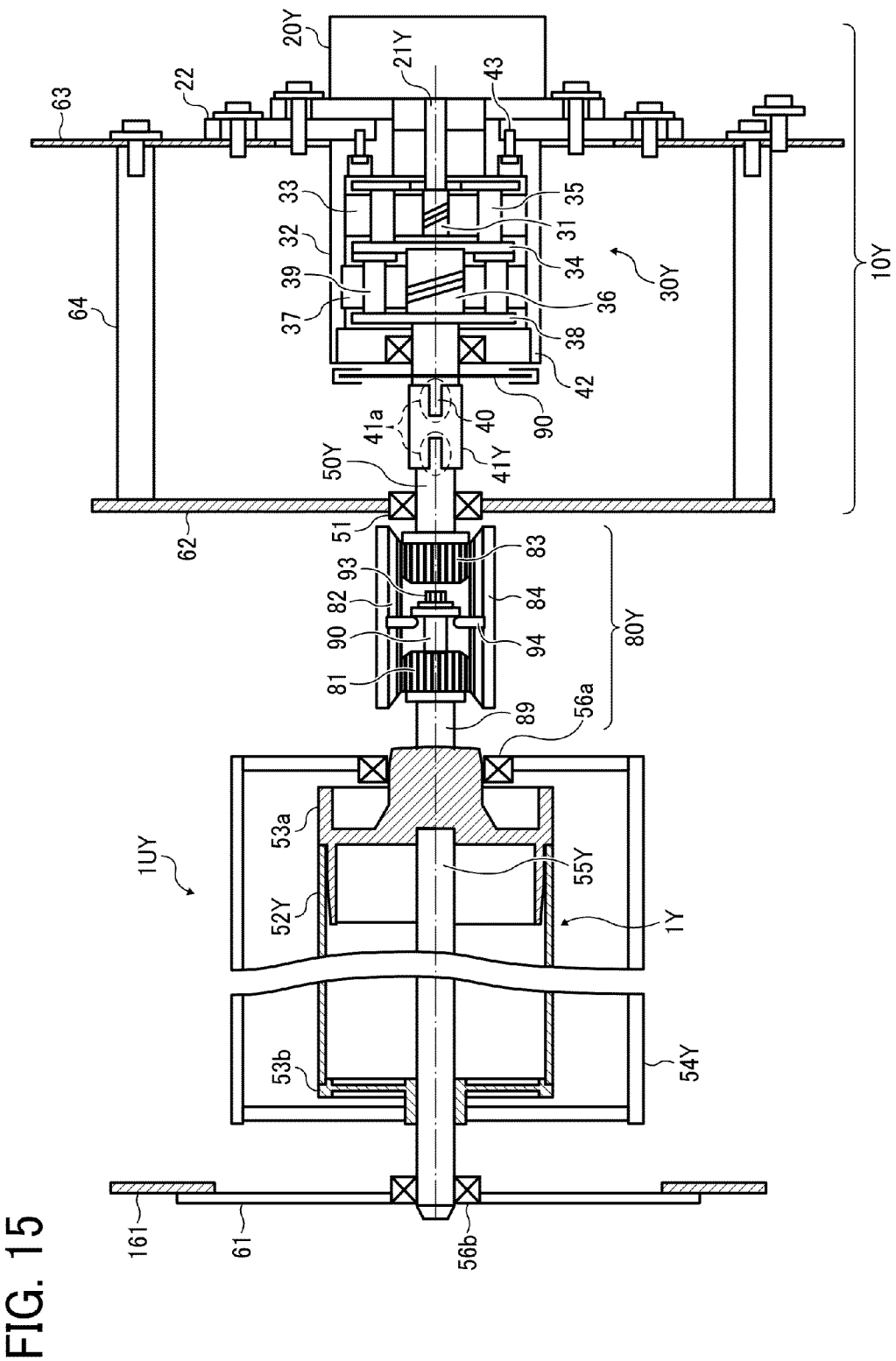
FIG. 15 is a schematic diagram illustrating a variation of the photosensitive-drum driving unit.

With reference to FIG. 15, a description is provided of a variation of the photosensitive-drum driving unit. FIG. 15 is a schematic diagram illustrating the variation of the photosensitive-drum driving unit. According to the present variation, the photosensitive-drum driving unit includes the two-stage coupling 80Y having the same configuration as that shown in FIG. 12.

However, the photosensitive drum assembly 1UY and the photosensitive-drum driver section 10Y are different from the configuration shown in FIG. 12.

As illustrated in FIG. 15, according to the present variation, the photosensitive-drum driver section 10Y includes the drive motor 20Y, the planetary gear decelerator 30Y, the joint 41Y, and the drive shaft 50Y. The planetary gear decelerator 30Y includes the output shaft 40. The output shaft 40 is connected to the drive shaft 50Y by the joint 41. The shaft bearing 51 is press fit on the drive shaft 50Y. The drive shaft 50Y is supported and positioned in place by the second frame 62 via the shaft bearing 51. After the photosensitive drum assembly is mounted, the drive shaft 50Y is supported by a shaft bearing fixed to the mounting plate 61 via the two-stage coupling 80Y and the drum shaft 55Y.

Next, with reference to FIG. 15, a description is provided of the configuration of the planetary gear decelerator 30Y. According to the present illustrative embodiment, the planetary gear decelerator 30 employs a two-stage 2K-H type planetary gear mechanism. In this example, the planetary gear mechanism includes two stages. Alternatively, depending on the required deceleration ratio, the planetary gear mechanism may include three or more stages.

Teeth of the first sun gear 31 are directly formed on the motor output shaft 21Y of the drive motor 20Y. The first planetary gear 33 of the first stage supported by the first carrier 34 of the first stage meshes with the internal gear 32 fixed to the first sun gear 31 and the bracket 22, and revolves around the periphery of the first sun gear 31. According to the present illustrative embodiment, a plurality of planetary gears, for example, three first planetary gears 33 are concentrically disposed for rotation balance and load dispersal. The number of planetary gears is not limited to three. More than three planetary gears can be used. Each of the first planetary gears 33 is supported by a first carrier pin 35 disposed on the first carrier 34 such that each of the first planetary gears 33 can rotate itself.

The plurality of first planetary gears 33 meshes with the first sun gear 31 and the internal gear 32 so that each of the first planetary gears 33 rotates while revolving around the first sun gear 31. The first carrier 34 supporting the first planetary gears 33 rotates slower than the rotation of the first sun gear 31, thereby obtaining a desired deceleration ratio at the first stage.

Next, the second sun gear 36 serves as an input for the second stage of the deceleration mechanism. The second sun gear 36 is provided at the center of rotation of the first carrier 34. It is to be noted that the first carrier 34 does not include a rotary supporting portion, thereby allowing the first carrier 34 to freely float (rotate). Similarly, the plurality of second planetary gears 37 of the second stage meshes with the second sun gear 36 of the second stage and the internal gear 32 extending to the second stage, and is supported by the second carrier 38 of the second stage. The internal gear of the first stage and the internal gear of the second stage are constituted as a single integrated unit as the internal gear 32. The second planetary gears 37 revolve around the periphery of the second sun gear 36.

Each of the second planetary gears 37 is supported by the second carrier pin 39 disposed on the second carrier 38 such that each of the second planetary gears 37 can rotate itself and revolve around the periphery of the second sun gear 36. The second carrier 38 of the second stage which is the last stage includes the output shaft 40 at the center of rotation of the second carrier 38. The output shaft 40 is connected to the drive shaft 50Y via the joint 41Y which is a hollow cylinder. The output shaft 40 of the second carrier 38 is supported by a shaft bearing press-fit to the internal gear cap 42 positioned in place by the internal gear 32.

The internal gear cap 42 is fitted to the inner circumference of the internal gear 32 and positioned in place. Accordingly, deviation of coaxiality between the output shaft 40 and the center of axis of the internal gear 32 can be minimized. The joint 41Y is a hollow cylinder. The diameter of the drive shaft 50Y and the diameter of the output shaft 40 of the planetary gear decelerator 30 are the same. The joint 41Y is press fit to the drive shaft 50Y. The joint 41Y includes a notch substantially at the center thereof The output shaft 40 is connected and fixed to the joint 41Y by a frictional force between a portion of the joint 41 pressed and bent by a screw for fixation.

As described above, the motor output shaft 21Y of the drive motor 20Y is supported by the bracket 22. The internal gear 32 is fixed to the bracket 22 by the screw 43. The bracket 22 fixedly holds the internal gear 32 and the drive motor 20Y.

The bracket 22 is fixed to the third frame 63 using a screw. The third frame 63 is supported and positioned in place by the stud 64 fitted to the second frame 62. The center of the shaft of the internal gear 32 at the drive motor side includes a hollow, cylinder-shaped boss. The inner circumference of the hollow, cylinder-shaped boss and the shaft bearing provided at the motor output shaft 21Y side are fitted together, thereby positioning the drive motor 20Y in place. The outer circumference of the hollow, cylinder-shaped boss is fitted to a hole of the bracket 22 and positioned in place.

With this configuration, the motor output shaft 21Y, the bracket 22, and the center of the output shaft 40 of the planetary gear decelerator 30Y are coaxially provided on the same axis, and the coaxiality error between these parts due to dimensional variations can be minimized, if not prevented entirely. In other words, the axial centers of the devices from the motor output shaft 21Y to the drive shaft 50Y are coaxially disposed on the same axis, and the deviation of the coaxiality between these parts due to dimensional variations can be reduced, if not prevented entirely.

Furthermore, the speed detector 44 is also disposed coaxially on the axial center of the internal gear 32, the motor output shaft 21Y, the bracket 22, and the output shaft 40 of the planetary gear decelerator 30Y The speed detector 44 includes, for example, an encoder and two detectors. The configuration of the speed detector 44 is not limited thereto. The number of detectors may be changed as needed depending on the required control accuracy.

The photosensitive drum 1Y includes the first drum flange 53a and the second drum flange 53b disposed at each end of the photosensitive drum 1Y. The photosensitive drum 1Y is positioned in place relative to the drum shaft 55Y via the first drum flange 53*a* and the second drum flange 53*b*. The second external gear 81 is formed integrally with the first drum flange 53*a* on the same shaft via the metal shaft 89.

The first drum flange 53*a* and the second drum flange 53*b* include a hole at the rotation center thereof, through which the drum shaft 55Y penetrates. The drum shaft 55Y is fitted to the hole and positioned in place. The first drum flange 53*a* and the second drum flange 53*b* that transmit power to the drum main body 52Y are press fit to the drum shaft 55Y. Accordingly, the drum main body 52Y is driven from the drive shaft 50Y to the two-stage coupling 80Y.

Although advantageous, misalignment of shaft centers and axis declination between the metal shaft 89 and the drive shaft 50Y may still occur in the above-described configuration attributed to manufacturing and assembly errors in the photosensitive drum assembly 1UY, resulting in a significant reaction force on each shaft. In particular, since the present variation employs a planetary gear system at the driving section of the photosensitive drum, a significant number of parts are used. As a result, the reaction force generated on the shafts at the connecting portion adversely affects meshing of the plurality of gears at the photosensitive-drum driver section. The degree by which imaging quality is degraded tends to be significant. However, in the present variation, with the use of the two-stage spline coupling swingable movement of the intermediate transmission member 84 equipped with the internal teeth 82 absorbs misalignment of shaft center and axis declination, hence transmitting rotation with high accuracy.

In the present variation, the axial centers of the devices from the motor output shaft 21Y of the photosensitive-drum driver section 10Y to the drive shaft 50Y are coaxially disposed on the same axis, and the deviation of the coaxiality between these parts due to dimensional variations of parts can be reduced, if not prevented entirely. The amount of axial deviation and axis declination to be absorbed is less than that of the above-described illustrative embodiments. Therefore, the present variation is advantageous in that the mating contact area is wide, and the transfer stiffness is high.

While the first illustrative embodiment and the second illustrative embodiment describe a power transmission device of the photosensitive drum, the power transmission device of the present disclosure can also be applied to devices including, but are not limited to the development roller and the cleaning roller in the image forming unit, and the drive roller in the intermediate transfer belt unit, the fixing roller of the fixing device, the transfer roller of the secondary transfer unit, and so forth.

Although the embodiment of the present disclosure has been described above, the present disclosure is not limited to the foregoing embodiments, but a variety of modifications can naturally be made within the scope of the present disclosure.

(Aspect A)

In Aspect A of the disclosure, a power transmission device includes a two-stage coupling such as the two-stage coupling 80Y including a drive coupling such as the first external gear 83 that receives power from the drive source of a main body of an image forming apparatus such as the main body 100 and rotate; a driven coupling such as the second external gear 81 disposed on a rotary shaft of the drive coupling and detachably attachable relative to the main body of the image forming apparatus; and an intermediate transmission member such as the intermediate transmission member 84 to mesh with the drive coupling and the driven coupling, the intermediate transmission member being held by one of the drive coupling and the driven coupling when the driven coupling is disengaged from the main body. One of the drive coupling and the driven coupling, whichever holds the intermediate transmission member, constitutes a retaining coupling including an attachment member such as the tubular member 81*b* attached to one of a drive-side device such as the drive shaft 50 and a driven-side device such as the drum shaft 55Y, and a stopper assembly including a stopper 85 to face the intermediate transmission member 84 in an axial direction of a rotary shaft of the drive coupling to prevent the intermediate transmission member 84 from moving in the axial direction and falling off from one side of the retaining coupling.

According to Aspect A, because the retaining coupling includes the attachment member to be attached to one of the drive-side device and the driven-side device, after the retaining coupling, which has not yet been assembled with the drive-side device and the driven-side device, meshes with the intermediate transmission member, the retaining coupling is attached to one of the drive-side device and the driven-side device using the attachment member.

Furthermore, the stopper prevents the intermediate transmission member held by the retaining coupling which has not yet been attached to the drive-side member and the driven-side member from falling off. In other words, in an environment in which the drive-side device and the driven-side device are free from interfering parts before attachment, thus facilitating operation, the intermediate transmission member and the retaining coupling can be engaged while preventing the intermediate transmission member from falling.

With this configuration, the internal teeth of the intermediate transmission member can mesh with the external teeth on the output shaft of the device with ease and the intermediate transmission member is prevented from falling, as compared with the known configuration in which the intermediate transmission member held on the output shaft in the device is prevented from falling after the internal teeth of the intermediate transmission member mesh with the external teeth formed directly on the output shaft of the device, thereby facilitating assemblage.

(Aspect B)

According to Aspect A, the stopper assembly includes an opposed portion (in the illustrative embodiment, the opposite plane facing the flange 86 of the second external gear 81) formed on the retaining coupling and facing the intermediate transmission member 84 in the axial direction, and a stopper 85 attached to the retaining coupling to interpose a portion of the intermediate transmission member 84 with the opposed portion in the axial direction.

With this configuration, the retaining coupling holding the intermediate transmission member 84 such that the intermediate transmission member 84 is interposed between the stopper 85 and the opposed member in the axial direction of the retaining coupling can be attached to the drive-side device such as the drive shaft 50Y or the driven-side device such as the drum shaft 55Y. When attaching the retaining coupling holding the intermediate transmission member 84 to the drive-side member or to the driven side member, the intermediate transmission member 84 is prevented from falling off from the retaining coupling. The retaining coupling holding the intermediate transmission member 84 can be attached to the drive-side coupling or to the driven-side coupling without paying attention to the intermediate transmission device so as not to drop the intermediate transmission member 84 from the retaining coupling, thereby facilitating assemblage.

Furthermore, when the driven coupling is removed from the main body and the intermediate transmission member 84 tilts to some degree due to self-weight, the intermediate transmission member 84 comes into contact with the stopper 85, thereby preventing the intermediate transmission member 84 from tilting more than a predetermined angle. Accordingly, upon installation of the driven coupling in the apparatus, the coupling without the intermediate transmission member 84 meshes with the intermediate transmission member 84.

(Aspect C)

According to Aspect B, the stopper 85 includes a notch 89a fitted with a projection 88 formed on the retaining coupling such as the second external gear 81, extending in a direction of rotation. The notch 89a is fitted with the projection 88, thereby attaching the stopper 85 to the retaining coupling.

With this configuration, the projection 88 can be long in the direction of rotation without degrading assemblage, as compared with a case in which the stopper 85 is attached to the retaining coupling such as the second external gear 81 by a snap-fit. Accordingly, a wide contact area of the stopper 85 and the projection 88 can be obtained, thereby reducing a pressure applied to the projection 88 from the stopper 85 and hence preventing damage to the projection 88.

(Aspect D)

According to Aspect C, the retaining coupling such as the second external gear 81 includes external teeth and the attachment member such as the tubular member 81b with the projection 88, and the intermediate transmission member 84 includes the internal teeth 82 meshing with the external gear of the retaining coupling and an external-tooth opposed portion such as the flange 86 facing the retaining coupling in the axial direction. The external teeth of the retaining coupling face the intermediate transmission member 84 in the axial direction. The external-tooth opposed portion is interposed between the external teeth of the retaining coupling and the stopper 85, thereby preventing the intermediate transmission member 84 from falling off from the retaining coupling.

With this configuration, the intermediate transmission member 84 is held reliably by the retaining coupling such that the intermediate transmission member 84 does not fall off in the axial direction.

(Aspect E)

According to Aspect D, a surface of the external-tooth opposed portion such as the flange 86 facing the stopper 85 and/or a surface of the stopper facing the external-tooth opposed portion is curved.

With this configuration, the flange 86 is prevented from getting caught by the opposed surface 185b of the flange 85b when the intermediate transmission member 84 swingably moves, thereby allowing the intermediate transmission member 84 to absorb misalignment of the shaft.

(Aspect F)

According to any one of Aspects C through E, the stopper 85 includes the guide groove 89b extending in the axial direction and connecting to the notch 89a, to guide the projection 88 to the notch 89a. The notch 89a extends from the guide groove 89b in the direction opposite to the direction of rotation during power transmission.

With this configuration, when the intermediate transmission member 84 tilts and comes into contact with the stopper 85 at the start of driving, exerting rotary force to the stopper 85, the projection 88 moves in such a direction as to fit to the notch 89a, hence preventing the projection 88 from getting disengaged from the notch 89a.

(Aspect G)

According to any one of Aspects C through F, the projection 88 includes a convex portion such as the convex portion 91 extending in the axial direction, and the notch 89a includes a concave portion such as the concave portion 92 to which the convex portion 91 is fitted.

With this configuration, when the intermediate transmission member 84 tilts and comes into contact with the stopper 85 at the start of driving, exerting rotary force to the stopper 85, the stopper 85 is prevented from rotating relative to the retaining coupling such as the second external gear 81.

(Aspect H)

According to any one of Aspects C through G, the length of the projection 88 in the axial direction is longer than that of the notch 89a in the axial direction.

With this configuration, the projection is press fit to the notch 89a lightly, preventing the stopper 85 from rotating relative to the retaining coupling such as the second external gear 81.

(Aspect I)

According to any one of Aspects B through H, a plurality of projections 88 is disposed at equal intervals in the direction of rotation.

With this configuration, when producing the retaining coupling such as the second external gear 81 through injection molding, uneven shrinkage is suppressed, thereby preventing degradation of mold accuracy of teeth of the retaining coupling.

(Aspect J)

According to any one of Aspects B through I, the stopper 85 faces the intermediate transmission member 84 with a certain gap therebetween in the axial direction.

With this configuration, the intermediate transmission member 84 can tilt at a desired angle, thereby absorbing misalignment of the shaft.

(Aspect K)

According to Aspect A, the stopper assembly is interposed between the flange portion 93a of the screw 93 and the retaining coupling. The screw 93 is fitted to the screw hole formed in the shaft center of the leading end surface 81B of the retaining coupling. The separation plate 94 that divides the space inside the hollow intermediate transmission member 84 is disposed on the inner wall of the intermediate transmission member 84. The separation plate 94 is interposed between the leading end surface 81B and a stopper such as the stopper 90 in the axial direction.

With this configuration, the separation plate 94 contacts the retaining coupling and the stopper 90 so that the intermediate transmission member 84 from falling off from the retaining coupling.

(Aspect L)

According to Aspect K, the shape of an end portion a rotary shaft such as the metal shaft 89 that is fitted to a fitting portion of the driven coupling has a non-circular shape in cross-section as viewed from the axial direction.

With this configuration, the contact area upon transmission of power is increased, thereby suppressing concentration of stress and enhancing durability. Furthermore, a cyclic speed variation in one rotation cycle and generation of higher-order component thereof are prevented.

(Aspect M)

According to Aspect L, the stopper 90 includes a portion with a small diameter such as the first portion 90a and a portion with a large diameter such as the second portion 90c. The center of the driven coupling includes a hole such as the hole 81A into which the first portion 90a is inserted.

This configuration facilitates workability in fixation of the stopper to the driven coupling.

(Aspect N)

According to Aspect M, a distance between the portion with the large diameter such as the second portion 90c and the driven coupling in the axial direction, and the diameter of the portion with the small diameter such as the first portion 90a of the stopper 90 are long enough so that the first portion 90a does not contact the separation plate.

With this configuration, high rotation transmission accuracy can be secured.

(Aspect O)

According to Aspect N, the stopper includes a through hole into which the screw is inserted, and the diameter of the through hole is greater than the diameter of the screw.

With this configuration, the retaining coupling and the screw can reliably hold the stopper.

(Aspect P)

According to Aspect O, the retaining coupling includes external teeth, and the intermediate transmission member includes internal teeth that mesh with the external teeth of the retaining coupling. The tubular member of the stopper with the large diameter such as the second portion does not contact the leading end of the internal teeth of the intermediate transmission member even when the intermediate transmission member tilts.

With this configuration, high rotation transmission accuracy can be secured.

(Aspect Q)

According to Aspect P, the distance between the drive coupling and the screw in the axial direction is long enough so that the drive coupling does not contact the screw, allowing the couplings to function properly.

(Aspect R)

An image forming apparatus includes a rotary body and the power transmission device including the two-stage coupling 80Y according to any one of Aspects A through Q, to transmit a driving force from a drive source to the rotary body.

With this configuration, even when a tolerance range of manufacturing errors of parts is increased, the driving force is transmitted to the rotary member properly with low manufacturing cost while providing high imaging quality.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A power transmission device, comprising:
a drive coupling to receive power from a drive source of a main body of an image forming apparatus and rotate;
a driven coupling disposed coaxially on a first rotary shaft of the drive coupling and detachably attachable relative to the main body of the image forming apparatus; and
an intermediate transmission member, including at least a first flange, to mesh with the drive coupling and the driven coupling, the intermediate transmission member being held by one of the drive coupling and the driven coupling in a state in which the driven coupling is disengaged from the main body,
wherein one of the drive coupling and the driven coupling, whichever holds the intermediate transmission member, constituting a retaining coupling including an attachment member attached to one of a drive-side device and a driven-side device, and a stopper assembly including at least a second flange facing the first flange of the intermediate transmission member in an axial direction of the first rotary shaft to prevent the intermediate transmission member from falling off from one side of the retaining coupling,
wherein the stopper assembly includes an opposed portion formed on the retaining coupling and facing the intermediate transmission member in the axial direction, and a stopper attached to the retaining coupling to interpose a portion of the intermediate transmission member with the opposed portion in the axial direction,
wherein the retaining coupling includes a projection extending in a direction of rotation of the retaining coupling, and the stopper includes a notch fitted with the projection to attach the stopper to the retaining coupling,
wherein the retaining coupling includes external teeth and the attachment member includes the projection,
wherein the intermediate transmission member includes internal teeth to mesh with the external teeth of the retaining coupling and an external-tooth opposed portion facing the external teeth of the retaining coupling in the axial direction, and the external-tooth opposed portion is interposed between the external teeth of the retaining coupling and the stopper to prevent the intermediate transmission member from falling off from the retaining coupling, and
wherein at least one of a surface of the external-tooth opposed portion facing the stopper and a surface of the stopper facing the external-tooth opposed portion is curved outwardly.

2. The power transmission device according to claim 1, wherein the stopper faces the intermediate transmission member with a certain gap therebetween in the axial direction.

3. The power transmission device according to claim 1, wherein the stopper includes a guide groove extending in the axial direction and connected to the notch to guide the projection to the notch that extends from the guide groove in a direction opposite to the direction of rotation during power transmission.

4. The power transmission device according to claim 1, wherein the projection includes a convex portion projecting in the axial direction, and the notch includes a concave portion to which the convex portion is fitted.

5. The power transmission device according to claim 1, wherein a length of the projection in the axial direction is longer than a length of the notch in the axial direction.

6. The power transmission device according to claim 1, wherein a plurality of projections is disposed at equal intervals in the direction of rotation.

7. The power transmission device according to claim 1, wherein the retaining coupling includes a screw hole formed in an axial center of a leading end surface thereof through which a screw is inserted,
wherein the intermediate transmission member includes a separation plate disposed on an inner surface thereof that divides a space inside the intermediate transmission member in the axial direction, and the separation plate is interposed between a flange portion of the screw and the retaining coupling, wherein the stopper assembly includes a stopper that interposes the separation plate with the leading end surface of the retaining coupling in the axial direction.

8. The power transmission device according to claim 7, comprising a second rotary shaft having an end portion to be fitted to a fitting portion of the driven coupling, wherein the end portion of the second rotary shaft has a non-circular shape in cross-section as viewed from the axial direction.

9. The power transmission device according to claim 8, wherein the stopper includes a first portion with a first diameter and a second portion with a second diameter larger than the first diameter, and a center of the leading end surface of the retaining coupling includes a hole into which the first portion is inserted.

10. The power transmission device according to claim 9, wherein a distance between the second portion of the stopper and the retaining coupling in the axial direction, and the diameter of the first portion of the stopper are long enough so that the first portion does not contact the separation plate when the intermediate transmission member tilts relative to the retaining coupling.

11. The power transmission device according to claim 10, wherein the stopper includes a through hole into which the screw is inserted, and a diameter of the through hole is greater than a diameter of the screw.

12. The power transmission device according to claim 11, wherein the retaining coupling includes external teeth, and the intermediate transmission member includes internal teeth that mesh with the external teeth of the retaining coupling, wherein the second portion of the stopper does not contact a leading end of the internal teeth of the intermediate transmission member even when the intermediate transmission member tilts relative to the retaining coupling.

13. The power transmission device according to claim 12, wherein the retaining coupling is the driven coupling, and the distance between the drive coupling and the screw in the axial direction is long enough so that the drive coupling does not contact the screw.

14. An image forming apparatus, comprising:
a rotary body; and
the power transmission device including the two-stage coupling according to claim 1 to transmit a driving force from a drive source to the rotary body.

15. A power transmission device, comprising:
a drive coupling to receive power from a drive source of a main body of an image forming apparatus and rotate;
a driven coupling disposed coaxially on a first rotary shaft of the drive coupling and detachably attachable relative to the main body of the image forming apparatus; and
an intermediate transmission member, including at least a first flange, to mesh with the drive coupling and the driven coupling, the intermediate transmission member being held by one of the drive coupling and the driven coupling in a state in which the driven coupling is disengaged from the main body, wherein one of the drive coupling and the driven coupling, whichever holds the intermediate transmission member, constituting a retaining coupling including an attachment member attached to one of a drive-side device and a driven-side device, and a stopper assembly including at least a second flange facing the first flange of the intermediate transmission member in an axial direction of the first rotary shaft to prevent the intermediate transmission member from falling off from one side of the retaining coupling, wherein the retaining coupling includes a screw hole formed in an axial center of a leading end surface thereof through which a screw is inserted, wherein the intermediate transmission member includes a separation plate disposed on an inner surface thereof that divides a space inside the intermediate transmission member in the axial direction, and the separation plate is interposed between a flange portion of the screw and the retaining coupling, wherein the stopper assembly includes a stopper that interposes the separation plate with the leading end surface of the retaining coupling in the axial direction, wherein a second rotary shaft having an end portion is to be fitted to a fitting portion of the driven coupling, wherein the end portion of the second rotary shaft has a non-circular shape in cross-section as viewed from the axial direction, and wherein the stopper includes a first portion with a first diameter and a second portion with a second diameter larger than the first diameter, and a center of the leading end surface of the retaining coupling includes a hole into which the first portion is inserted.

16. The power transmission device according to claim 15, wherein a distance between the second portion of the stopper and the retaining coupling in the axial direction, and the diameter of the first portion of the stopper are long enough so that the first portion does not contact the separation plate when the intermediate transmission member tilts relative to the retaining coupling.

17. The power transmission device according to claim 16, wherein the stopper includes a through hole into which the screw is inserted, and a diameter of the through hole is greater than a diameter of the screw.

18. The power transmission device according to claim 17, wherein the retaining coupling includes external teeth, and the intermediate transmission member includes internal teeth that mesh with the external teeth of the retaining coupling, wherein the second portion of the stopper does not contact a leading end of the internal teeth of the intermediate transmission member even when the intermediate transmission member tilts relative to the retaining coupling.

19. The power transmission device according to claim 18, wherein the retaining coupling is the driven coupling, and the distance between the drive coupling and the screw in the axial direction is long enough so that the drive coupling does not contact the screw.

* * * * *